United States Patent [19]

Clemens

[11] Patent Number: 5,368,137
[45] Date of Patent: Nov. 29, 1994

[54] BRAKE APPLY RESPONSE CONTROL

[75] Inventor: Joseph A. Clemens, Brownsburg, Ind.

[73] Assignee: General Motors Corporation, Detroit, Mich.

[21] Appl. No.: 17,233

[22] Filed: Feb. 12, 1993

[51] Int. Cl.$^5$ ............................................. B60T 11/00
[52] U.S. Cl. ................................. 188/71.5; 188/346
[58] Field of Search ................... 188/346, 71.1, 71.5, 188/72.1, 70 B, 72.4

[56] References Cited

U.S. PATENT DOCUMENTS

| | | | |
|---|---|---|---|
| 2,826,276 | 3/1958 | Helvern et al. | 188/346 |
| 3,173,517 | 3/1965 | Powlas | 188/346 |
| 3,277,982 | 10/1966 | Kimberlin | 188/346 |
| 3,923,345 | 12/1975 | Poggie | 188/346 X |
| 5,056,874 | 10/1991 | Hall, III | 303/50 |

Primary Examiner—Robert J. Oberleitner
Assistant Examiner—Lee W. Young
Attorney, Agent, or Firm—Donald F. Scherer

[57] ABSTRACT

A brake apply system having both a mechanical system and a hydraulic system. The hydraulic system will supply the majority of braking effort. It is desirable to initiate the mechanical system slightly before the fluid brake system. If only light braking pressure is engaged upon the brake system of the operator, the brake system control valve will reduce the amount of flow to the brake apply piston. To provide for a more rapid filling, and therefore more consistent brake reaction times within the system, a valve mechanism responsive to the reaction torque within the locating brake members is provided to establish a direct fluid connection between the brake apply piston and the line pressure or main pressure of the transmission control.

5 Claims, 17 Drawing Sheets

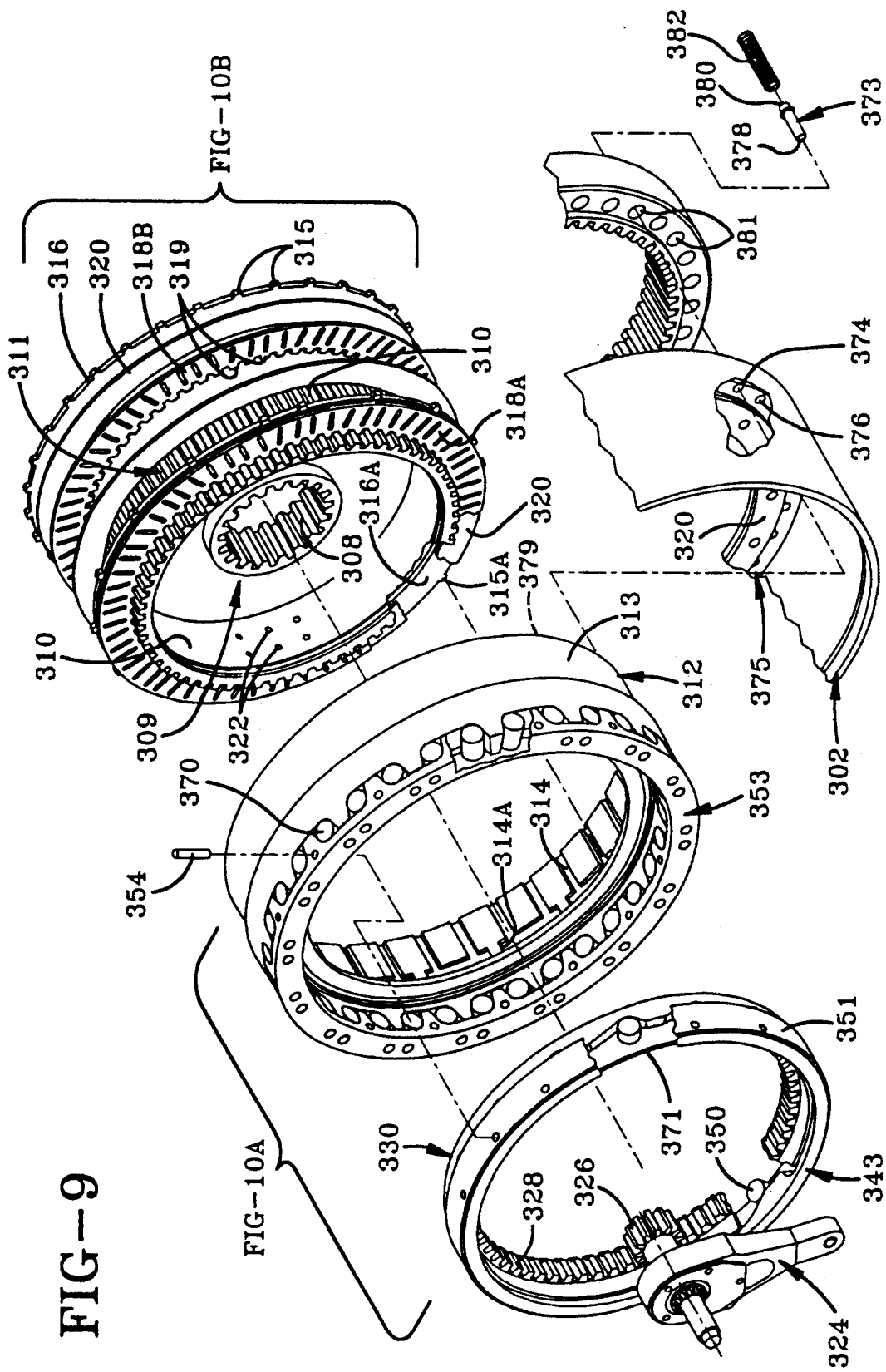

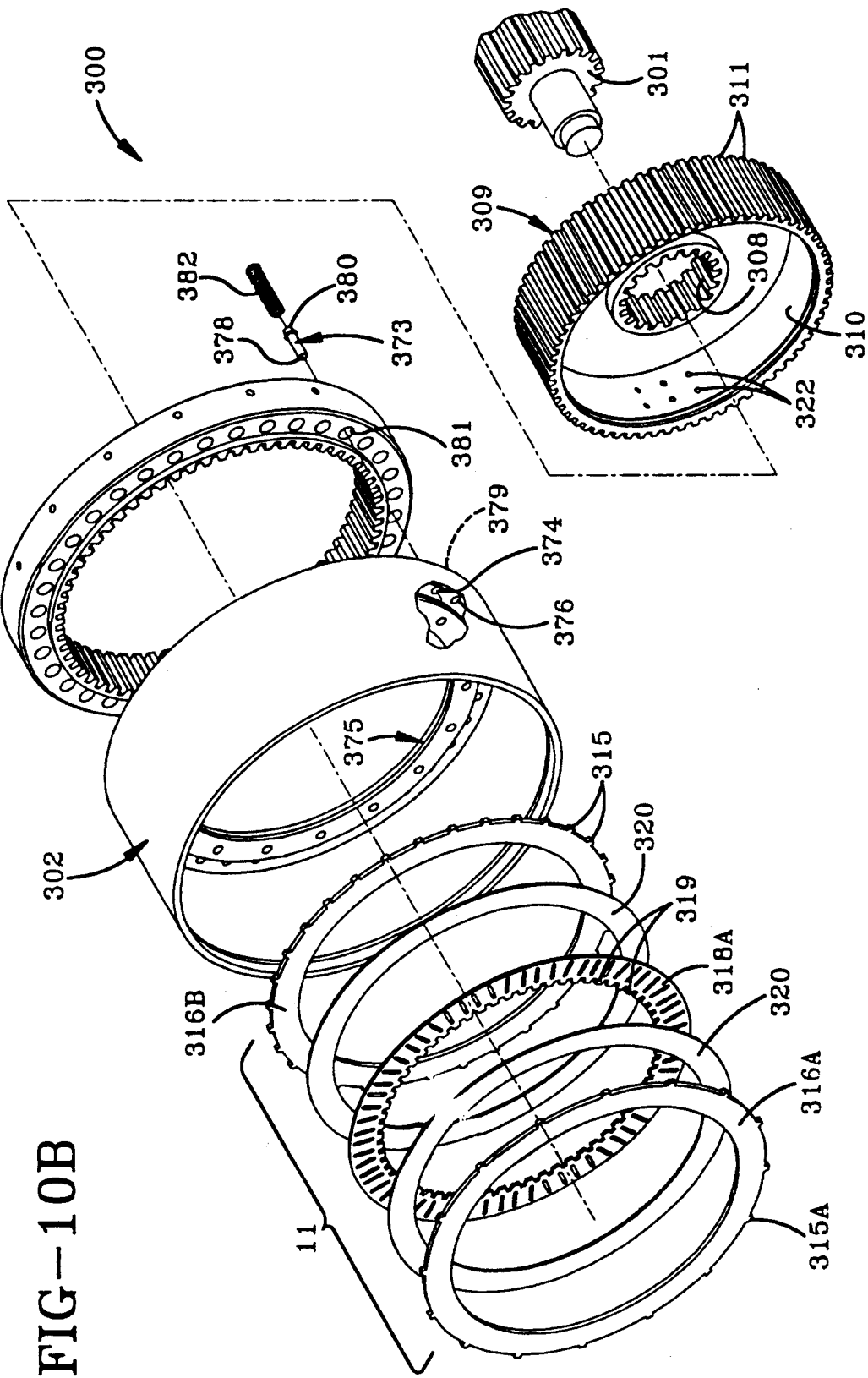

BRAKE APPLY RESPONSE CONTROL

TECHNICAL FIELD

The present invention relates generally to the vehicular braking systems. More particularly, the present invention relates to a rapid filling system for hydraulically applied brake systems. Specifically the present invention relates to a mechanism for controlling a valve member to supply full line pressure to the brake system such that hydraulic brake actuation will begin regardless of the amount of brake action called for by the operator.

BACKGROUND OF THE INVENTION

In track laying vehicles, the hydraulic brake pressure is controlled by a regulator valve which is actuated by an operator-controlled foot pedal or other brake input device. The amount of actuation, that is the input supplied by the operator, determines the hydraulic pressure to be transmitted to the brakes. During partial brake pressure applied the applied pressure is low and can result in extended actuation times which delays the movement of the brake apply systems.

SUMMARY OF THE INVENTION

It is, therefore, a primary object of this invention to provide an improved hydraulic apply brake system wherein initial brake torque reaction is in the braked assembly and will force valve control resulting in rapid fluid filling of the brake system.

It is another object of the present invention to provide an improved hydraulic apply brake system, as above, that initially provides the hydraulic brake apply piston with full main pressure regardless of the requested apply pressure.

It is a further object of the present invention to provide an improved hydraulic apply brake system, as above, wherein the brake apply valve is sensitive to brake torque capacity such that the brake cooling signal fluid is initially utilized to activate the brake pistons.

These and other objects of the invention, as well as the advantages thereof over existing and prior art forms, which will be apparent in view of the following detailed specification, are accomplished by means hereinafter described and claimed.

In general, the brake apply system has both a mechanical system and a hydraulic system. The hydraulic system will supply the majority of braking effort. It is desirable to initiate the mechanical system slightly before the fluid brake system. If only light braking pressure is engaged upon the brake system of the operator, the brake system control valve will reduce the amount of flow to the brake apply piston. To provide for a more rapid filling, and therefore more consistent brake reaction times within the system, a valve mechanism responsive to the reaction torque within the locating brake members is provided to establish a direct fluid connection between the brake apply piston and the line pressure or main pressure of the transmission control.

The present invention is described in conjunction with two exemplary embodiments of the brake control system. These embodiments are deemed sufficient to effect the full disclosure of the subject invention. The exemplary brake control system is described in detail without attempting to show all of the various forms and modifications in which the invention might be embodied; the invention being measured by the appended claims and not by the details of the specification.

BRIEF DESCRIPTION OF THE DRAWINGS

FIG. 9 is an enlarged, partially exploded perspective of the brake apply assembly depicted in FIGS. 7 and 8 removed from the housing, and with selected components of the brake apply assembly disposed in their juxtaposed, operative relationship;

FIG. 10B is an exploded perspective of that portion of FIG. 9 designated as "FIG-10B" and depicting another portion of the brake apply assembly removed from the housing;

DESCRIPTION OF AN EXEMPLARY EMBODIMENT

Figure 1:
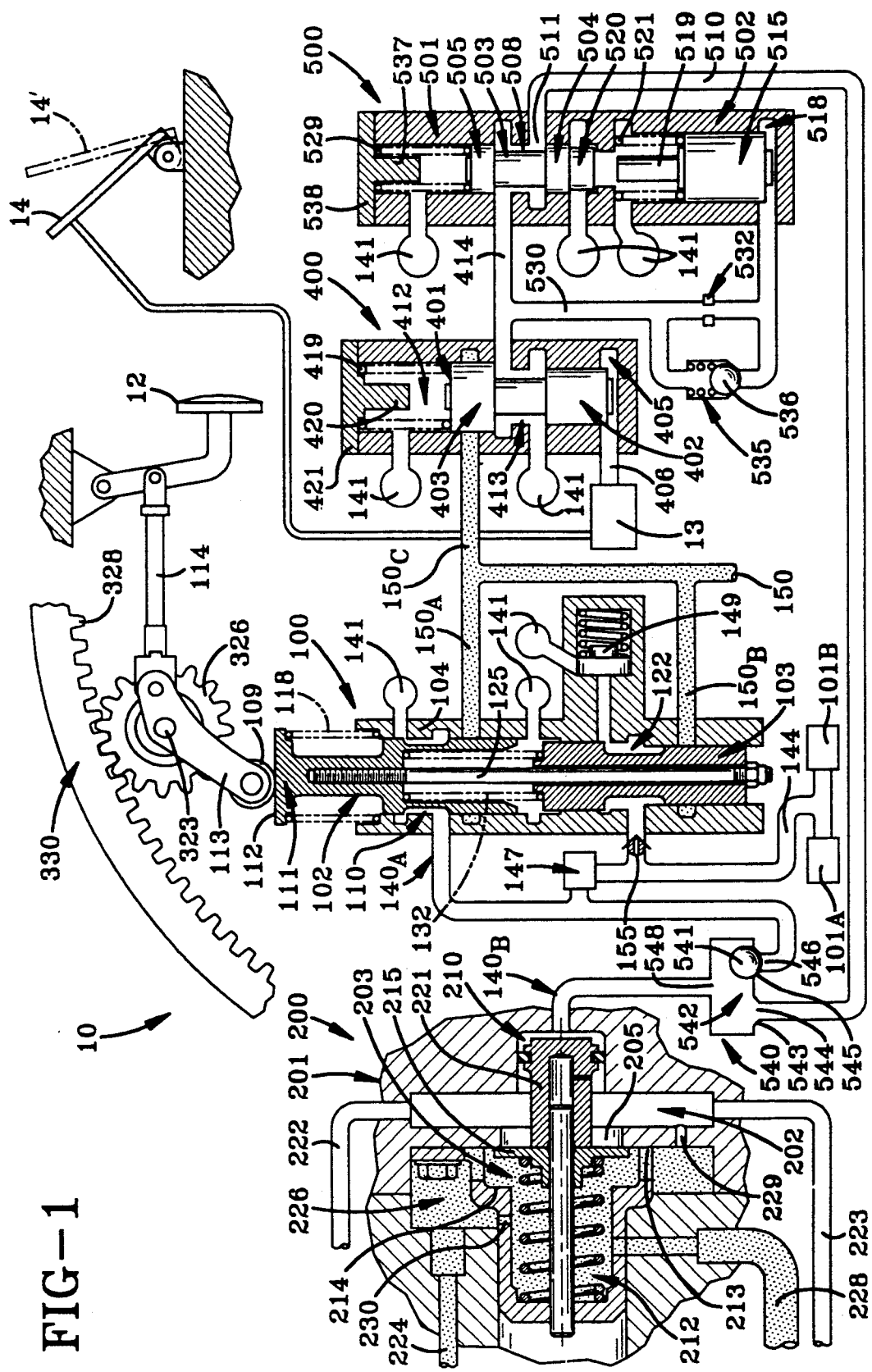
FIG. 1 is a schematic drawing representing the major components utilized in a throttle responsive, as well as a brake apply, pre-cooling system for a hydraulically and/or mechanically actuated vehicular braking mechanism, the arrangement depicting the system under the condition that no operating pressure is being applied to the brake pedal, and the throttle pedal has been substantially depressed—as would be the situation when the vehicle is moving under power.

One representative form of a brake cooling and control system embodying the concepts of the present invention is designated generally by the numeral 10 on the accompanying drawings. The representative brake cooling system 10, schematically depicted in FIG. 1, may employ a brake apply valve 100 that sequentially stages the flow of coolant to the brake packs 11 (hereinafter shown and described in conjunction with FIGS. 7, 8 and 11) upon initial depression of the brake pedal 12. The brake apply valve 100 also controls the flow of fluid which effects hydraulic actuation of the vehicular brake packs 11 in response to continued depression of the brake pedal 12. The structural description, as well as the aforesaid functions, of the brake apply valve 100 will be hereinafter described in detail.

The brake cooling system 10 also employs a brake coolant valve 200. The brake coolant valve 200 directs, the actual flow of the coolant fluid to the brake packs 11. The brake coolant valve 200 and the means by which it is actuated will also be hereinafter more fully explained.

The present brake cooling system 10 uniquely responds to the control pressure provided by a computerized control member 13 in response to the actuation pressure applied to the throttle pedal 14. Specifically, the throttle responsive control pressure is fed from the control member 13 to a modulator signal valve 400. The modulator signal valve 400 operates in conjunction with a combined cut-off/timer valve assembly 500 to supply a pre-cooling bath to the brake packs 11 in response to the operator's operation of the throttle pedal 14. The structure, and the operation, of the modulator signal valve 500 and the cut-off/timer valve assembly 400, will also be hereinafter described in detail.

Figure 2:
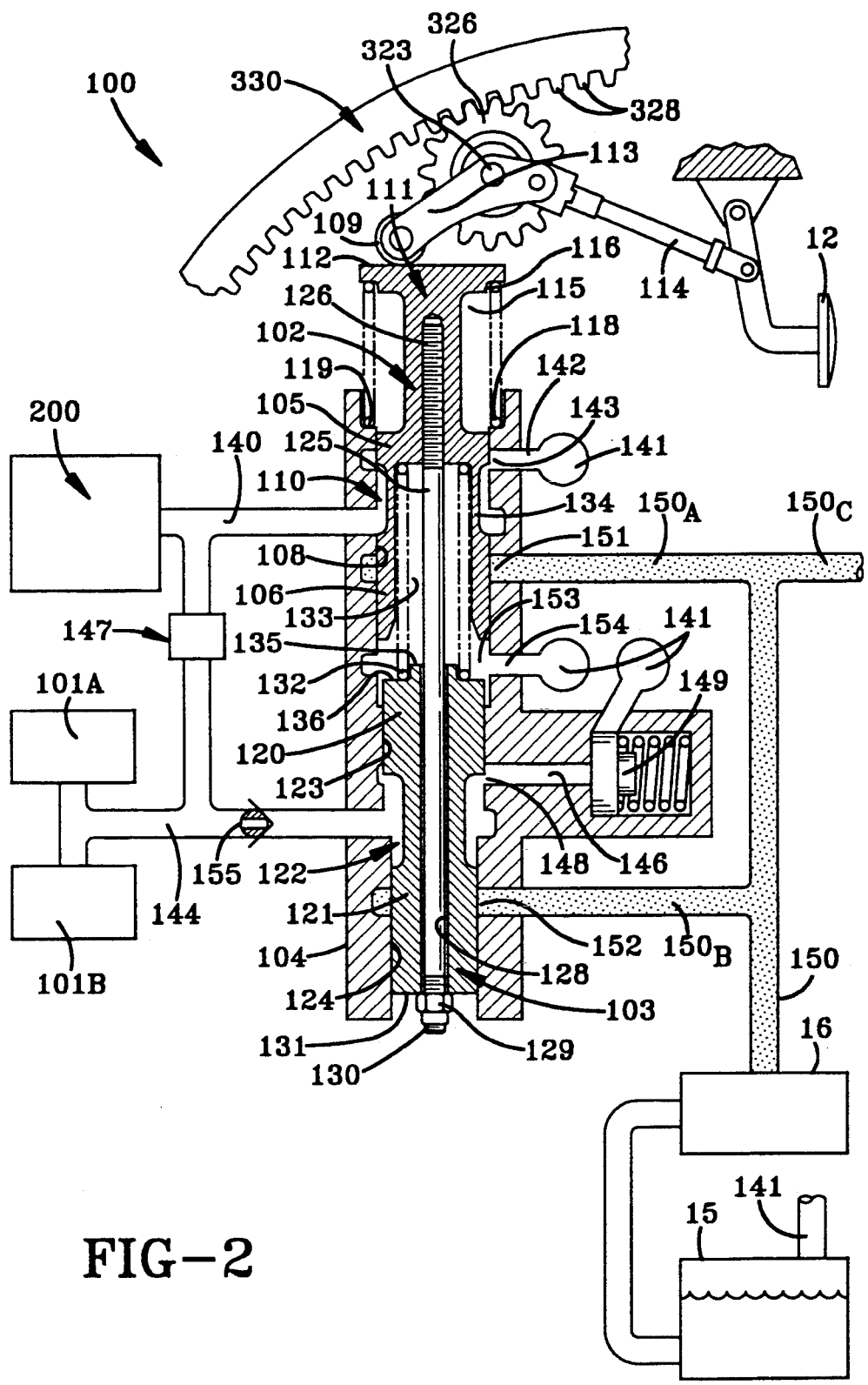
FIG. 2 is an enlarged portion of FIG. 1 depicting the brake apply valve in schematic, axial cross section.
Figure 3:
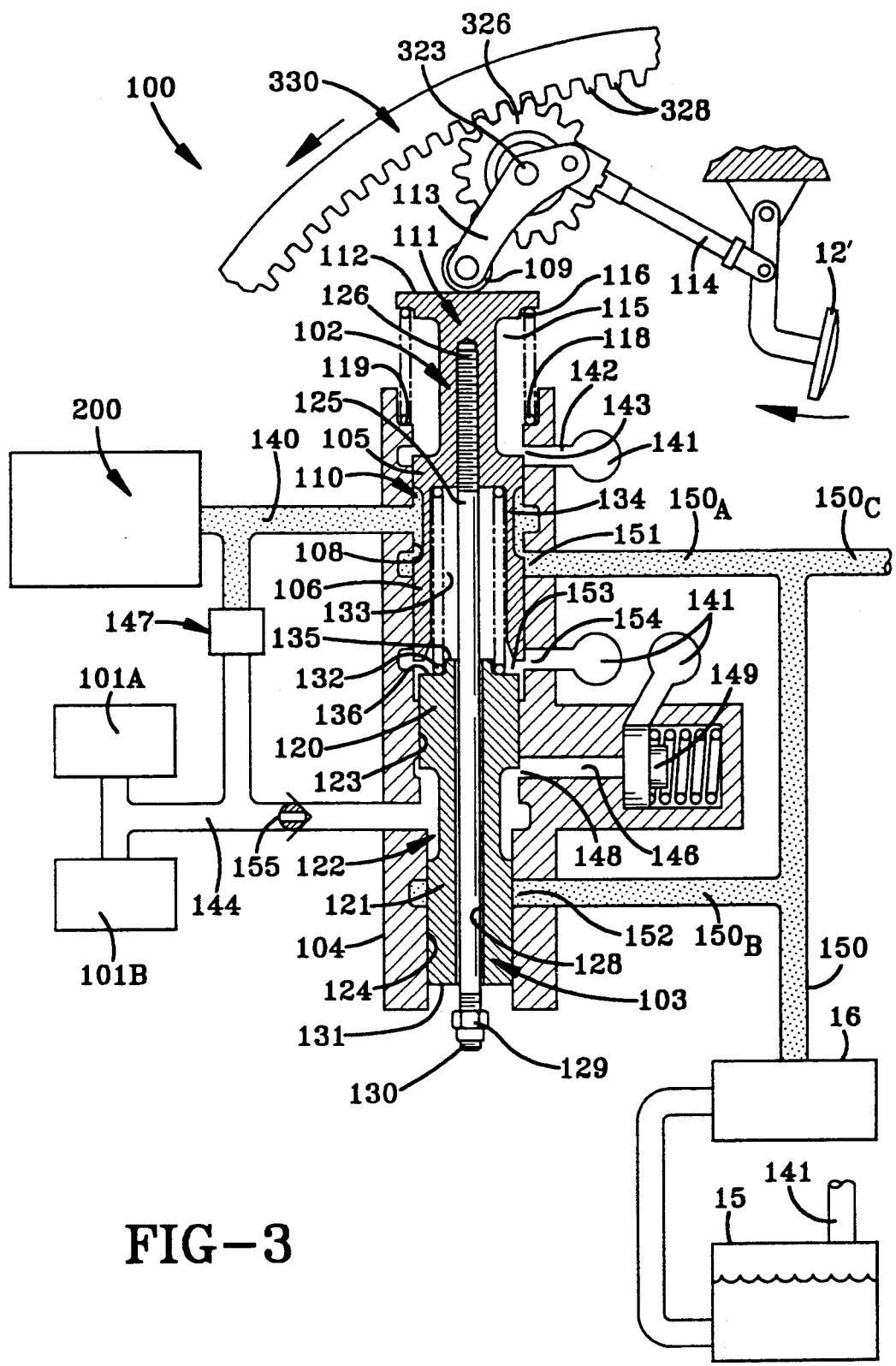
FIG. 3 is a view similar to FIG. 2, but depicting the components of the brake apply valve disposed in response to the initial depression of the brake pedal by the vehicle operator.
Figure 4:
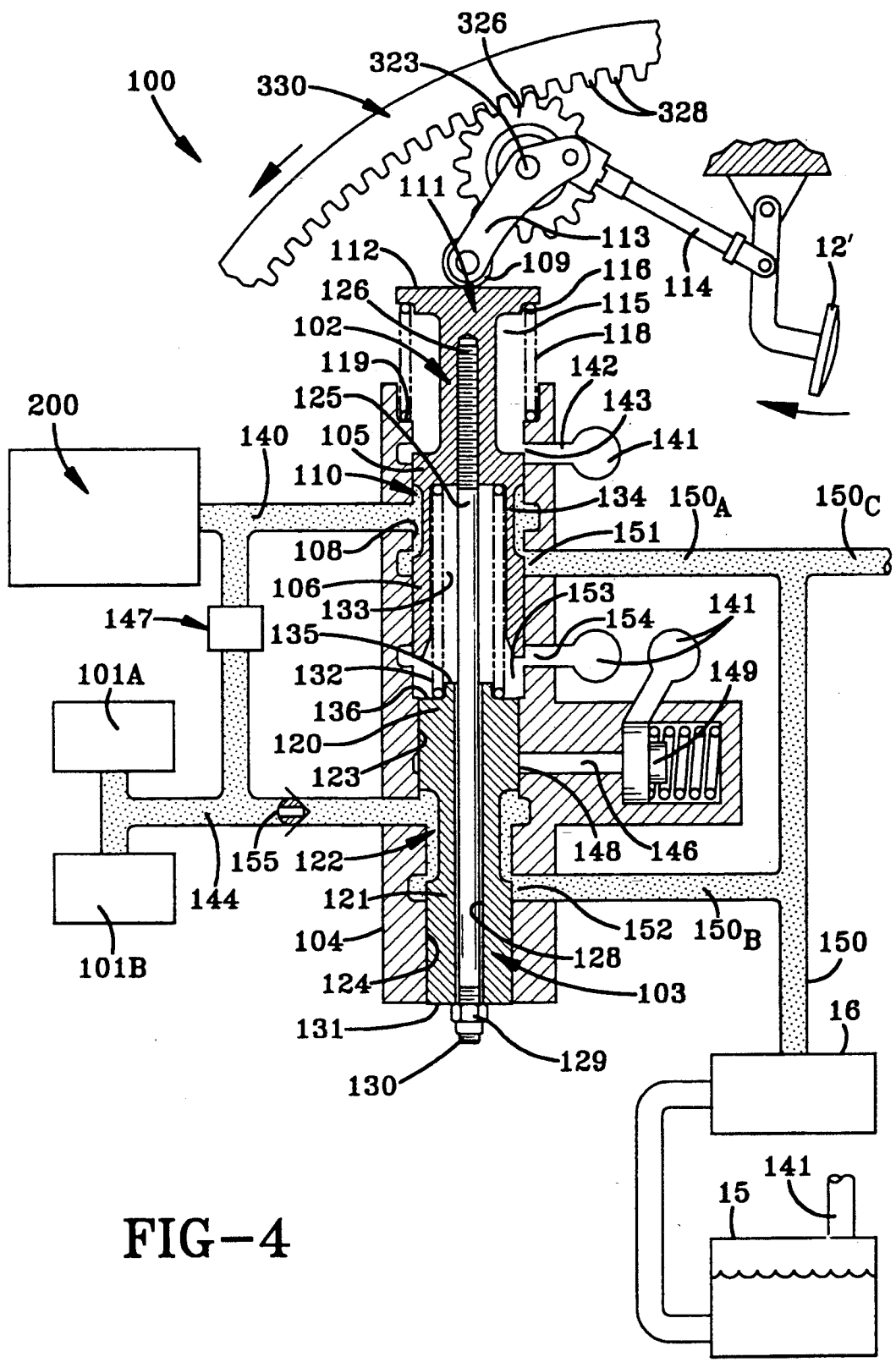
FIG. 4 is a view similar to FIGS. 2 and 3, but depicting the components of the brake apply valve disposed in response to continued depression of the brake pedal.

It should be noted that the hydraulic fluid employed to actuate the brakes may also be the source of the fluid employed to cool the brakes, and that fluid may be stored in a reservoir 15, as best seen in FIGS. 2-4. A pump 16 is generally employed to supply hydraulic fluid from the reservoir 15 to the brake apply valve 100 at the desired mainline pressure. The means by which the present brake cooling system 10 supplies a pre-cooling bath to the brake packs 11 will become apparent by virtue of the detailed description which follows.

Several peripheral components may be effectively employed in the overall brake cooling system 10 which will, for overall clarity, be described individually. It has been deemed appropriate to describe the operation of each such component in conjunction with the structural description thereof. There will, of course, be a brief description as to the operation of the overall invention at the end of the specification, but in order to preclude the necessary for an overly cumbersome description at that point, the election was made to provide an operational description for each component, as that component is described.

Brake Apply Valve

Turning now to an explanation of the brake apply valve 100, it must be understood that the brake apply valve 100 controls the application of pressurized hydraulic fluid, such as oil, to the cylinders 101 which operate the brake packs 11 of a vehicle. The brake apply valve 100 also provides a brake apply signal pressure to operate a brake coolant valve 200 which, in turn, controls the application of a coolant—normally cooled hydraulic fluid available from the same source as the hydraulic fluid flowing to, or through, the brake apply valve 100—to the engageable torque transfer device employed by the brake packs 11 of the vehicle.

As depicted in FIGS. 2 through 4, the brake apply valve 100 employs pair of axially aligned, and spaced, first and second spool members 102 and 103 that are received within a housing 104 for axial translation. The first spool member 102 has a pair of axially spaced, first and second cylindrical lands 105 and 106, respectively, of equal diameter which slidingly engage a first, cylindrical, interior wall portion 108 of the housing 104 to define a brake apply signal chamber 110 between the lands 105 and 106.

Figure 10A:
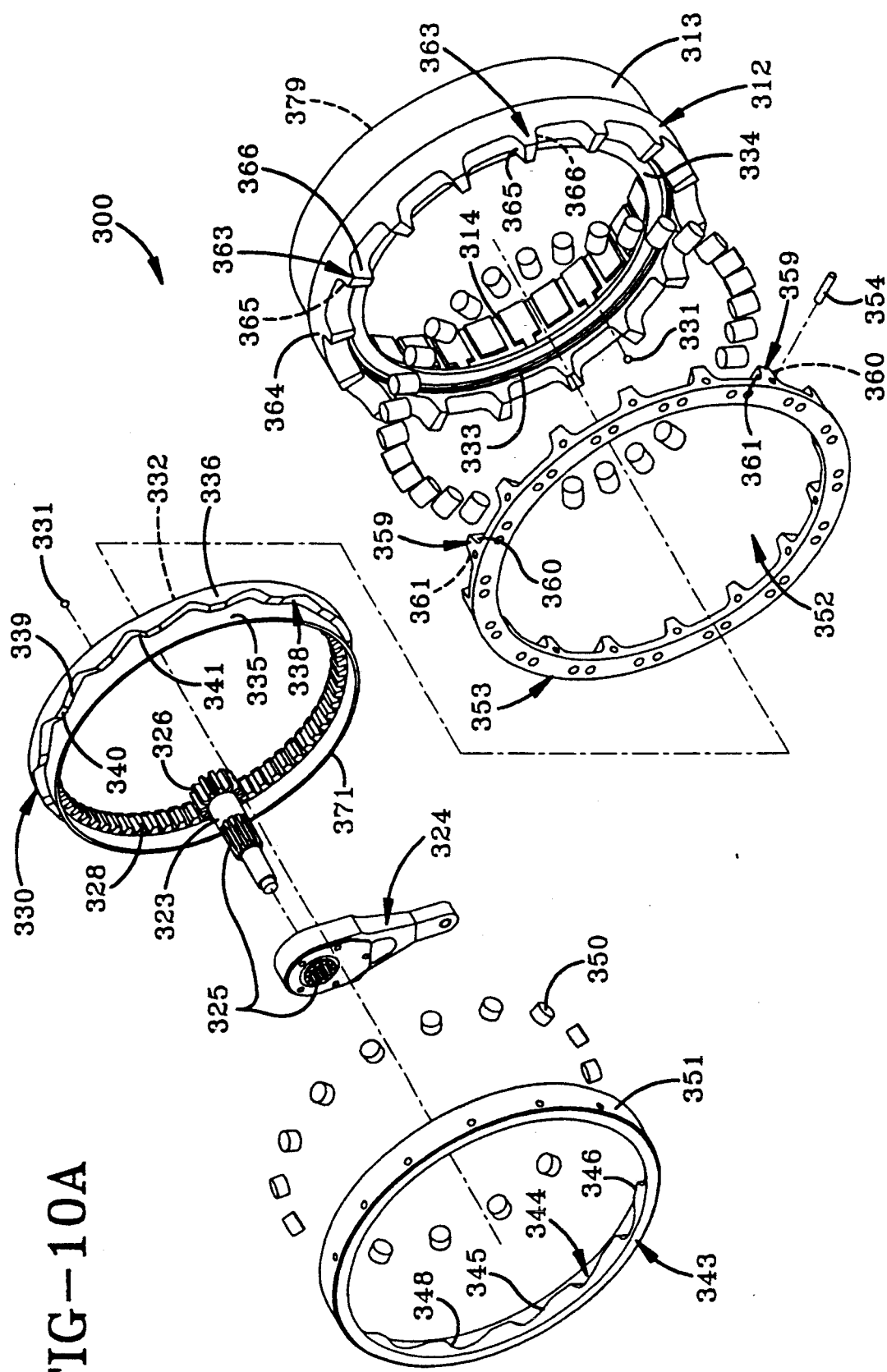
FIG. 10A is an exploded perspective of that portion of FIG. 9 designated as "FIG-10A" and depicting a portion of the brake apply assembly removed from the housing.

The first spool member 102 has a head portion 111, the outwardly directed face 112 of which may be engaged by a low friction roller presented from an actuating arm 113. The roller 109 applies a displacing force to the spool member 102 in response to the application of force to the brake pedal 12 by the operator. When the actuating arm 113 is mechanical, as depicted in the drawings, it may be mounted for rocking action in response to depression of a brake pedal 12 by the operator of the vehicle. The connection between the brake pedal 12 and the actuating arm 113 may be accomplished by link means, such as shown at 114. The actuating arm 113 may, as shown, be mounted on an extension of the apply shaft 323, that is more fully shown and described in conjunction with the mechanical and hydraulic apply system 300 depicted in FIG. 10A, or the actuating arm 113 may be connected by other suitable force transfer systems to the apply lever assembly 324 that is also shown and described in conjunction with FIG. 10A.

The head portion 111 of the first spool member 102 may be annularly recessed, as at 115, to present an annular rim 116 that is engaged by a compression, return spring 118 which acts between the Opposed, annular rim 116 and a shelf 119 presented from the housing 104. The return spring 118 applies a biasing resistance to translation of the first spool member 102, and that resistance may be reflected against depression of the brake pedal 12 in order to provide a tactile feed-back to the operator. Moreover, the return spring 118 tends to maintain the first spool member 102 in, or to return the first spool member 102 to, the unactuated state depicted in FIG. 2.

The second spool member 103 has a pair of axially spaced, first and second cylindrical lands 120 and 121 of unequal diameter. The lands 120 and 121 are slidably disposed in sealing engagement with a stepped diameter bore in the housing 104. Specifically, the lands 120 and 121 cooperate with the interior of the housing 104 to define a brake apply chamber 122 therebetween. The first land 120, which is of greater diameter than the second land 121, slidingly engages a second, cylindrical, interior wall portion 123 presented from the housing 104, and the second land 121 slidingly engages a third, cylindrical, interior wall portion 124 presented from the housing 104. The functional purpose of the differential areas presented to the brake apply chamber 122 by the first and second lands 120 and 121, respectively, will be hereinafter more fully described.

A connecting rod 125 is anchored in the first spool member 102, as by the threaded attachment 126, and the connecting rod 125 extends slidingly through an axial bore 128 in the second spool member 103 to terminate in a retaining cap 129 that may also be secured to the connecting rod 125, as by the threaded attachment 130. The retaining cap 129 engages one end face 131 on the second spool member 103 to delineate the limit to which the second spool member 103 can separate axially from the first spool member 102.

A regulating compression spring 132 is interposed between the first and second spool members 102 and 103. As depicted, the interior of the first spool member 102 may be axially recessed, as at 133, such that the second land 106 is supported from a skirt portion 134. The regulating spring 132 is received within the axial recess 133 and extends axially outwardly therefrom to engage a centering pedestal 135 that extends axially outwardly from the other end face 136 of the second spool member 103. The functional operation achieved by having the regulating spring 132 continuously bias the two spool members 102 and 103 apart will also be hereinafter more fully described.

The unactuated disposition of the components in the brake apply valve 100 is determined by the unopposed biasing action of the return and regulating springs 118 and 132, respectively, as represented in FIG. 2. In the unactuated state of the brake apply valve 100 the brake signal chamber 110 communicates with the brake coolant valve 200 by virtue of a brake apply signal feed conduit 140, and the brake signal chamber 110 also communicates with the hydraulic return system 141 through an exhaust conduit 142. Specifically, the exhaust conduit 142 opens to the brake signal chamber 110 through an exhaust port 143. In the unactuated state of the brake apply valve 100, therefore, the brake apply signal chamber 110 provides a path by which the hydraulic fluid which actuates the brake coolant valve 200 can enter the hydraulic return system 141 to deactivate the brake coolant valve 200 and thereby terminate the flow of cooling fluid to the brake packs 11. The specific, structural details of the brake coolant valve 200 are also hereinafter more fully described.

In the unactuated state of the brake apply valve 100, the brake apply chamber 122 communicates with the brake cylinders 101A and 101B by virtue of a brake apply feed conduit 144. The feed conduit 144 opens to the brake apply chamber 122 through an outlet port 145. The brake apply chamber 122 also communicates with the hydraulic return system 141, but through a second exhaust conduit 146 that opens to the brake apply chamber 122 through an exhaust port 148. The exhaust conduit 146 includes a check valve 149 which allows the actuating pressure to be relieved from the brake cylinders 101 but which precludes the brake cylinders 101 from emptying. This allows for virtually instantaneous response by the brake cylinders 101 upon the application of actuating pressure through the brake apply valve 100, as will be hereinafter more fully described.

The signal conduit 140 is in communication with a normally open solenoid control valve 147 which controls communication between the signal conduit 140 and the brake feed conduit 144. Back flow from the feed signal conduit 140 into the valve 100 via conduit 144 is prevented by a conventional check valve 155 which includes a flow restriction to prevent fluid from being trapped within the conduit 144. The solenoid valve 147 is a conventional solenoid type valve which is closed upon the introduction of an electrical signal through the solenoid coil to prevent fluid flow from the conduit 140 to the conduit 144.

In the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified it shall be referenced by virtue of a letter suffix employed in combination with the numerical designation utilized for general identification of that structural member, component or arrangement. Thus, there are at least two brake cylinders which are generally identified by the numeral 101, but the specific, individual brake cylinders are, therefore, identified by the alphanumeric designations 101A and 101B in the specification and on the drawings. When two quite similar, or even identical, components are closely related to a third component, the two similar components shall be identified by the same numerical designation as the component to which they are related, except that the similar components shall be referenced by virtue of a letter subscript employed in combination with the numerical designation utilized for identification of the related component. These same suffix conventions shall be employed throughout the specification.

As previously noted, the source of hydraulic fluid employed to actuate the brakes may also be the source of the fluid employed to cool the brakes, and that fluid may be stored in a reservoir 15 that is fed by the hydraulic return system 141. A pump 16 is generally employed to supply hydraulic fluid from the reservoir 15 to the brake apply valve 100 at the desired mainline pressure. As shown, the pressurized hydraulic fluid from the pump 16 is fed into the brake apply valve 100 by branches $150_A$ and $150_B$ of a supply conduit 150. In the unactuated state of the brake apply valve 100, pressurized hydraulic fluid is not provided access to either the brake signal chamber 110 or the brake apply chamber 122. Instead, the second land 106 on the first spool member 102 blocks the inlet port 151 by which the first branch conduit $150_A$ opens through the first, cylindrical, interior wall portion 108 of the housing 104 selectively to feed the brake signal chamber 110. Similarly, the second land 121 on the second spool member 103 blocks the inlet port 152 by which the second branch $150_B$ opens through the third, cylindrical, interior wall portion 124 of the housing 104 selectively to communicate with the brake apply chamber 122.

When the vehicle operator initially depresses the brake pedal 12 the roller 109 on the actuating arm 113 applies a force against the outwardly directed face 112 on the head portion 111 of the first spool member 102. The force applied by the actuating arm 113 translates the first spool member 102, as depicted in FIG. 3, when that force is sufficient to overcome the biasing action of the return spring 118. As the first spool member 102 is thus translated, the first land 105 thereon blocks the exhaust port 143, thereby closing communication between the brake signal chamber 110 and the hydraulic return system 141. That same translation of the first spool member 102 also translates the second land 106 away from the inlet port 151 to permit communication between the first branch 150$_A$ and the brake signal chamber 110. Mainline hydraulic pressure is thereupon transmitted through the brake signal chamber 110 and the brake apply signal feed conduit 140 to open the brake coolant valve 200 and allow cooled hydraulic fluid to bathe, and cool, the brake packs 11. This operation of the brake coolant valve 200 is also hereinafter described.

Any hydraulic fluid which may inadvertently accumulate within the recess 133, or the space 153 between the first and second spool members 102 and 103, continuously empties into the hydraulic return system 141 through the third exhaust conduit 154. As the first spool member 102 translates in response to depression of the brake pedal 12, the connecting rod 125 will slide along the axial bore 128 which extends through the second spool member 103, and only the biasing action of the regulating spring 132 will effect translation of the second spool member 103 toward the then displaced retaining cap 129 that determines the extent to which the second spool member 103 can move axially away from the first spool member 102.

As shown in FIG. 4, the regulating spring 132 initially translates the second spool member 103 such that the first land 120 thereon closes the exhaust port 148 by which the exhaust conduit 146 opens through the second cylindrical interior wall portion 123, thereby closing the brake apply chamber 122 to the hydraulic return system 141. As is also represented in FIG. 4, continued translation of the second spool member 103 translates the second land 121 thereon to open the inlet port 152 to permit the introduction of pressurized hydraulic fluid from the second supply branch 150$_B$ into the brake apply chamber 122. The foregoing description delineates an arrangement wherein an "underlap" exists as to the spacing of the lands 120 and 121 relative to the spacing of the respective ports 148 and 152 with which the lands 120 and 121 interact.

It is also possible to space the lands 120 and 121 relative to the ports 148 and 152 such that they are "line-on-line." That is, the lands 120 and 121, and/or the ports 148 and 152, may be spaced such that at the instant one port closes, the other port is opening. Finally, it is possible to effect a disposition which constitutes an "overlap." In an overlap disposition the land 121 would open port 152 just prior to the closure of port 148 by land 120.

These three relationships of the lands to the ports are well known to the art, and they are mentioned herein merely to establish that the brake apply valve will operatively accommodate any of the three relationships to accomplish any of the objectives achieved by those three relationships.

Because the check valve 149 does not permit either the brake cylinders 101 or the brake apply feed conduit 144 to empty, the pressurized fluid introduced into the brake apply chamber 122 is applied virtually instantaneously to the brake cylinders 101 through the brake apply feed conduit 144. As the downstream pressure within the feed conduit 144 increases, that pressure will be reflected in the brake apply chamber 122 to be applied against the projected areas of the lands 120 and 121 which define the opposed, axial boundaries of the brake apply chamber 122.

Because the projected area of land 120 exposed to the brake apply chamber 122 is greater than the projected area of land 121 exposed to the brake apply chamber 122, the hydraulic pressure within the brake apply chamber 122 acts on that differential area to create a force that moves the second spool member 103 against the biasing action of the regulating spring 132. The displacement of the second spool member 103 toward the first spool member 102 will depend upon the relative biasing pressure of the regulating spring 132 in comparison to the differential force applied to the second spool member 103 by the pressure of the hydraulic fluid with the brake apply chamber 122.

As long as the differential force exceeds the biasing action of the regulating spring 132, the second spool member 103 will be urged toward the first spool member 102, even to the point of opening the exhaust port 148 which allows the fluid within the brake apply chamber 122 to exit into the hydraulic return system 141. However, as the pressure within the brake apply chamber 122 falls, the differential force acting on the opposed lands 120 and 121 of the second spool member 103 will be overcome by the biasing action of the regulating spring 132 to close the exhaust port 148 and reopen the second inlet port 152.

It must be appreciated that the translated location of the first spool member 102 directly controls the force which need be applied to the regulating spring 132 by the second spool member 103 in order to effect communication between the brake apply chamber 122 and either the hydraulic return system 141 or the supply branch 150$_B$. Hence, the greater the pressure applied by the operator to effect translation of the first spool member 102, the greater will be the brake apply pressure required in the feed conduit 144 to open the exhaust port 148 by which to effect communication with the hydraulic return system 141.

As a result, the apply pressure directed to the brake cylinders 101 through the brake apply valve 100 is regulated in response to the amount of force applied by the vehicle operator to the foot pedal 12. In addition, the operator is continuously supplied with tactile feed-back through the contact of his foot with the pedal 12. Such tactile feed-back has been found to enhance the operator's visual observation of the vehicular speed reduction in response to his application of foot pressure upon the pedal 12.

Brake Coolant Valve

To reiterate, the brake coolant valve 200 controls the flow of a coolant —normally the cooled hydraulic fluid available from the same source as the hydraulic fluid flowing to, or through, the brake apply valve 100—to the engageable torque transfer device—i.e.: the brake packs 11 employed in the braking system of a vehicle—during their application. The brake coolant valve 200 is actuated by the brake apply signal pressure emanating from the brake apply signal chamber 110 in the brake apply valve 100, as previously described.

Figure 5:
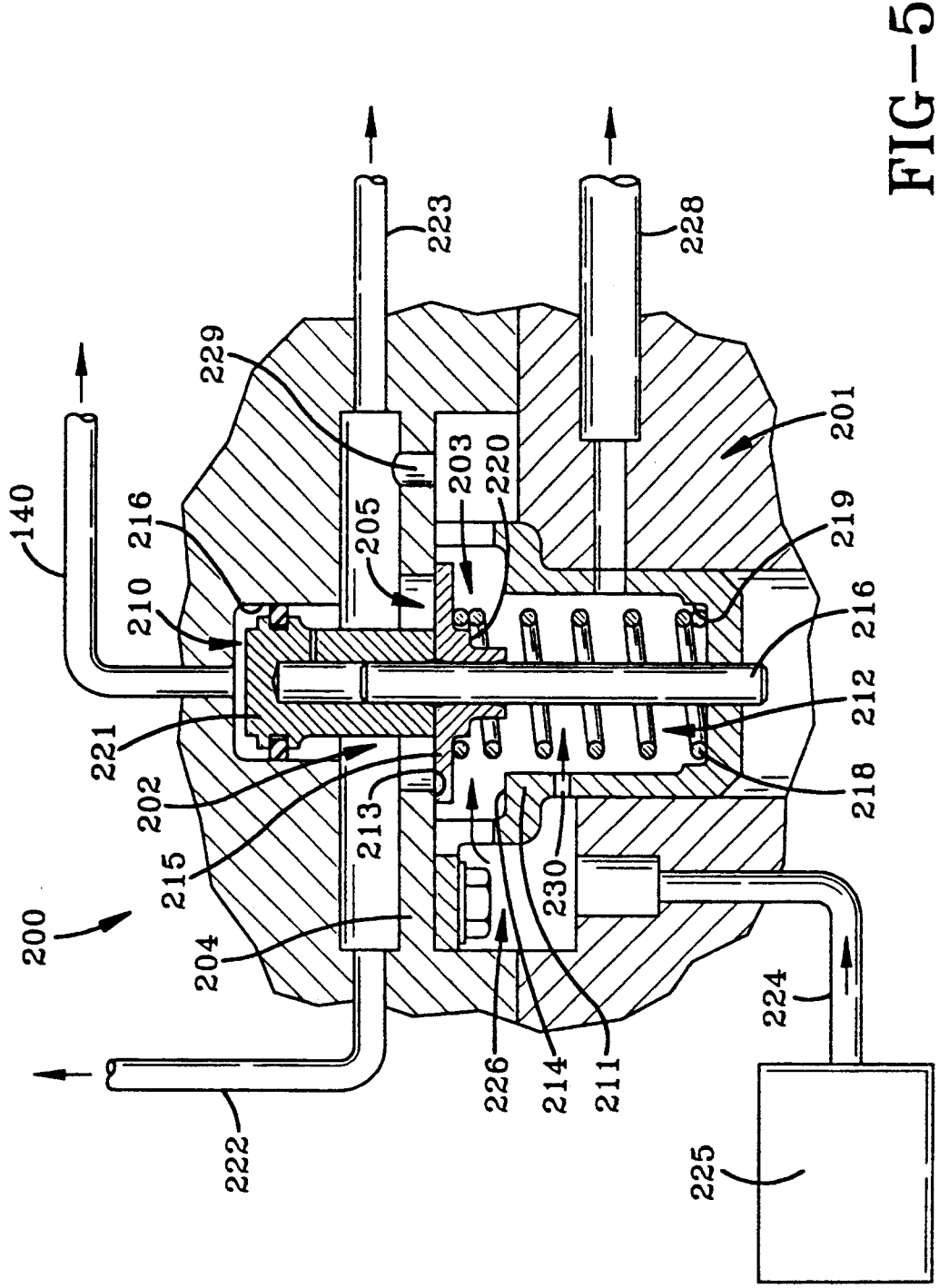
FIG. 5 is an enlarged portion of FIG. 1 depicting the components of the brake coolant valve disposed in response to continued depression of the throttle pedal and without depression of the brake pedal.
Figure 6:
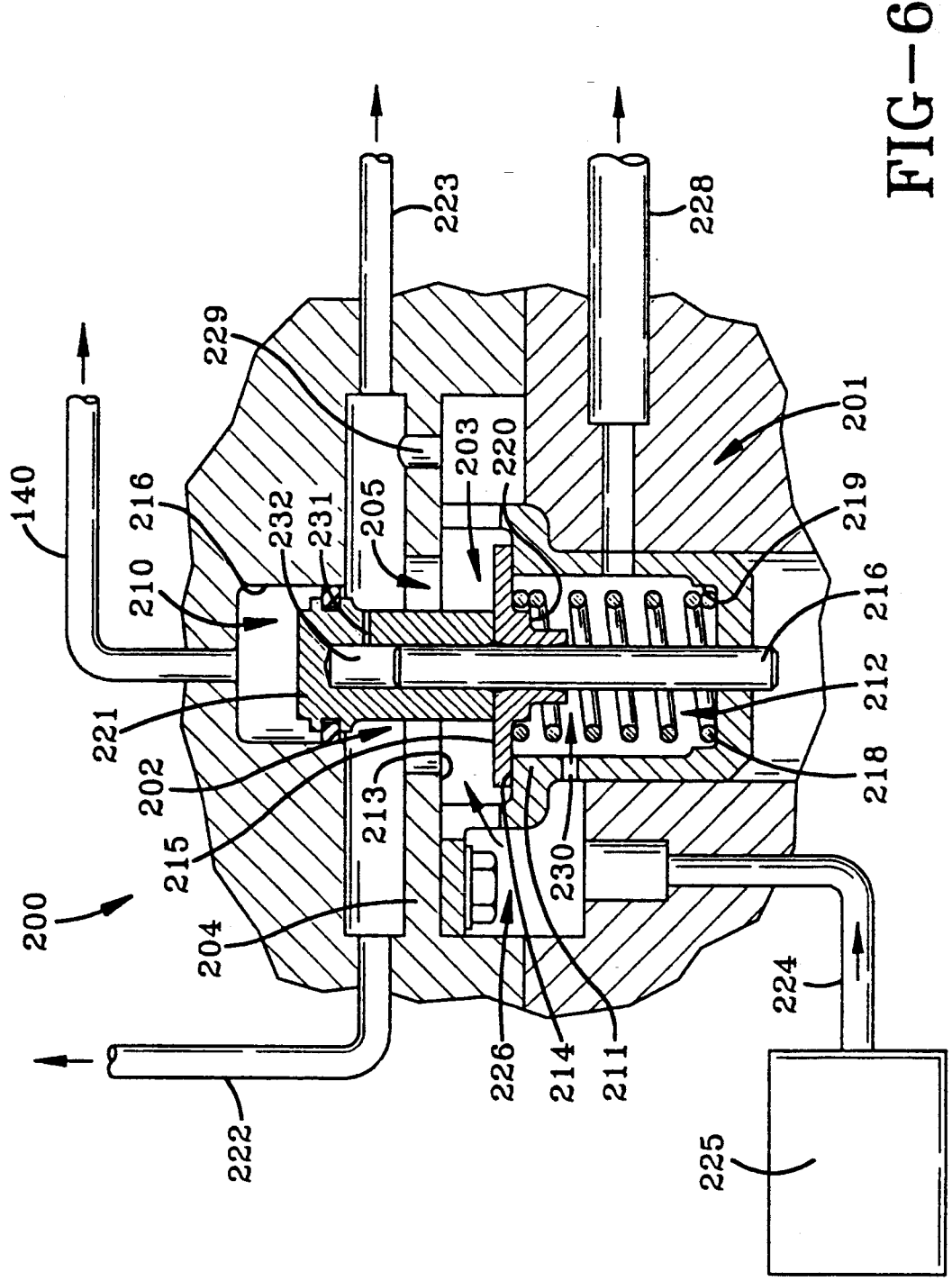
FIG. 6 is a view similar to FIG. 5, but depicting the components of the brake coolant valve disposed as they are in response to depression of the brake pedal and/or in response to the removal of actuating pressure from the throttle pedal.

The mechanism of the brake coolant valve 200—as depicted in FIGS. 5 and 6—may be contained within a multi-piece housing 201 that may be incorporated integrally with, or separate from, the housing 104 within which the brake apply valve 100 is received. In either situation, the housing 201 contains a first, or coolant delivery, chamber 202 and a second, or lubricant delivery, chamber 203 separated by a transverse, medial wall 204 that is penetrated by a passage 205 through which communication between the first and second chambers 202 and 203 can be selectively effected. A piston chamber 210 extends axially outwardly from the coolant delivery chamber 202.

A shoulder 211 is presented in axially spaced relation from the medial wall 204 with the coolant delivery chamber 203 disposed between the medial wall 204 and the shoulder 211. A lubricant deliver sub-chamber 212 extends axially outwardly from the lubricant delivery chamber 203 past the shoulder 211. A first valve seat 213 is presented from the medial wall 204 in spaced opposition to a second valve seat 214 presented from the shoulder 211.

A valve element 215 is translatable between the first and second valve seats 213 and 214 along the axis of a pilot pin 216 that is fixedly secured to the housing 201. A compression spring 218 acts between the housing 201 and the valve element 215 to bias the valve element 215 into operative engagement with the first valve seat 213 which circumscribes the passage 205 that communicates between the first and second valve chambers 202 and 203, respectively, within the housing 201 of the brake coolant valve 200. As shown, the compression spring 218 may circumscribe the pilot pin 216 with one end received within a cylindrical anchoring recess 219 in the housing 201 and with the other end received over a centering boss 220 provided on the underside of the valve element 215. The compression spring 218 continuously biases the valve element 215 toward engagement with the first seat 213 in order to preclude flow between the second and the first valve chambers 203 and 202 through the passage 205.

A valve operating piston 221 is received within the piston chamber 210 that extends axially outwardly from the first, or coolant delivery, chamber 202 in the housing 201. The piston chamber 210 communicates with a feed conduit 140 that originates within the brake signal chamber 110 of the brake apply valve 100. The valve element 215 is operatively connected to the piston 221, as by a surface engagement therebetween, such that the valve element 215 translates in direct response to translation of the piston 221. As such, it may prove desirable for the piston 221 to be integral with the valve element 215.

The first chamber 202 communicates with coolant feed lines 222 and 223 that delivers the cooling fluid to the torque transfer device utilized by the hereinafter described brake packs 11. A supply conduit 224 from the cooler 225 communicates with an entry chamber 226 to admit the cooled hydraulic fluid into the second chamber 203. When the brake coolant valve 200 is closed, as depicted in FIG. 5, the main volume of the cooled hydraulic fluid entering the second chamber 203 through the hydraulic fluid supply conduit 224 from the cooler 225 flows into the lubricant delivery sub-chamber 212 and is then discharged through the lubricant distribution conduit 228 which communicates with the sub-chamber 212. In addition, a small portion of the cooled hydraulic fluid entering the second chamber 203 is delivered to the first chamber 202 through a first, restricted orifice 229 in Order to provide an uninterrupted supply of cooling fluid with which to bathe the brake packs 11, even when it is not being applied.

When the brake apply valve 100 is operated in response to initial depression of the pedal 12, a brake apply signal pressure is provided to the piston chamber 210 in the brake coolant valve 200 from the brake signal chamber 110 in the brake apply valve 100, as previously described. The brake apply signal pressure acts within the piston chamber 210 to translate the operating piston 221 and displace the valve element 215 away from the first valve seat 213 and into sealing engagement with the second valve seat 214, as shown in FIG. 6. This full displacement of the valve element 215 fully opens the passage 205 and thereby permits the cooled hydraulic fluid in the second chamber 203 of the brake coolant valve 200 to flow into the first chamber 202 and out through the feed lines 222 and 223 to the brake packs 11. The resulting unrestricted flow of the cooled hydraulic fluid from the second chamber 203 to the first chamber 202 allows virtually the full flow of the cooled hydraulic fluid through the supply conduit 224 from the cooler 225 to be made available to cool the brake pads when they are being applied.

A second, restricted orifice 230 communicates between the entry chamber 226 and the lubricant delivery chamber 212 to assure that at least a small portion of the cooled hydraulic fluid will be provided for general lubrication, even when the brakes are applied. During application of the brakes, therefore, a continued small portion of the hydraulic fluid is permitted to pass from the entry chamber 226, through the second restricted orifice 230, into the lubrication delivery sub-chamber 212, and from there into conduit 228. This arrangement assures the continued flow of at least a minimal quantity of lubricating fluid to the remainder of the system, even during the application of maximum braking effort.

In order to ensure that the valve element 215 will be properly displaced in response to the application of the signal pressure within the piston chamber 210 it may be astute to provide a relief passage 231 which will allow any fluid that might inadvertently collect within the pilot bore 232 which receives the pilot pin 216 to exit outwardly through the relief passage 231 and not obstruct the operation of the piston 221 or the valve element 215. By selecting a suitable cross sectional area for the relief passage 231 that passage can admit fluid into the pilot bore 233 when the valve is in its unactuated state (FIG. 5), and modestly restrict the exiting flow of fluid from the pilot bore 232, thereby hydraulically dampening the translational opening movement of the valve element 215. By thus damping the translation of the valve element 215 it will not open the passage 205 too quickly nor will the valve element 215 translate in response to any transient spike in the signal pressure applied to chamber 210.

Brake Apply Ramp

A combined, mechanical and hydraulic brake apply assembly 300—which may be incorporated in cooperation with the brake cooling system 10—is depicted in FIGS. 7 through 11. The brake apply assembly 300 effects the application of brake apply force to the brake packs 11 in response to both mechanically and hydraulically generated forces. The mechanically and hydraulically generated forces may be individually applied, simultaneously applied or applied in selected sequential and/or simultaneous combinations. The brake packs 11 are operatively associated with the output shafts 301 of a transmission. The details of the transmission, being well known to the art, are not depicted in the drawings attached hereto. The brake assembly 300 is received within a brake housing 302 that is typically located linearly adjacent the transmission casing 303 so that rotation of the transmission output shaft 301 can be transmitted to the brake apply assembly 300 received within the brake housing assembly 302. One may, if desired, combine the brake housing 302 with the transmission casing 303, but for simplification of the present explanation they will be deemed to be contiguous, but separate.

The shaft 301 is connected by a spline 307 to a carrier assembly 317 of a planetary gear set 327. The planet carrier assembly 317 has pinion gears 347 which mesh with a ring gear 357 and a sun gear. The sun gear is identified by the spline-teeth 306 formed on a sun gear shaft 304. The sun gear shaft 304 provides an input member for the planetary gear set 327. A sleeve shaft 329 is drivingly connected to the sun gear shaft 304 by teeth 305 and is connectible through teeth 337 to a conventional drive shaft from a transmission, not shown. The sleeve shaft 329 is movable axially to permit ease of connection between the planetary gear set 327 and the transmission in a well known manner. The spline-teeth 306 on the sun gear shaft 304 also operatively engage the splines 308 on a hub member 309. A radially outer rim 310 of the hub member 309 is provided with a plurality of axially extending splines 311 operatively to engage the brake pack 11. Actuation of the brake pack 11, as hereinafter explained, will provide a direct connection between the casing 303 and the sun gear shaft 304. This will create a braking effect on the carrier assembly 317, and therefore shaft 301, which will provide slowing of the vehicle.

Figure 7:
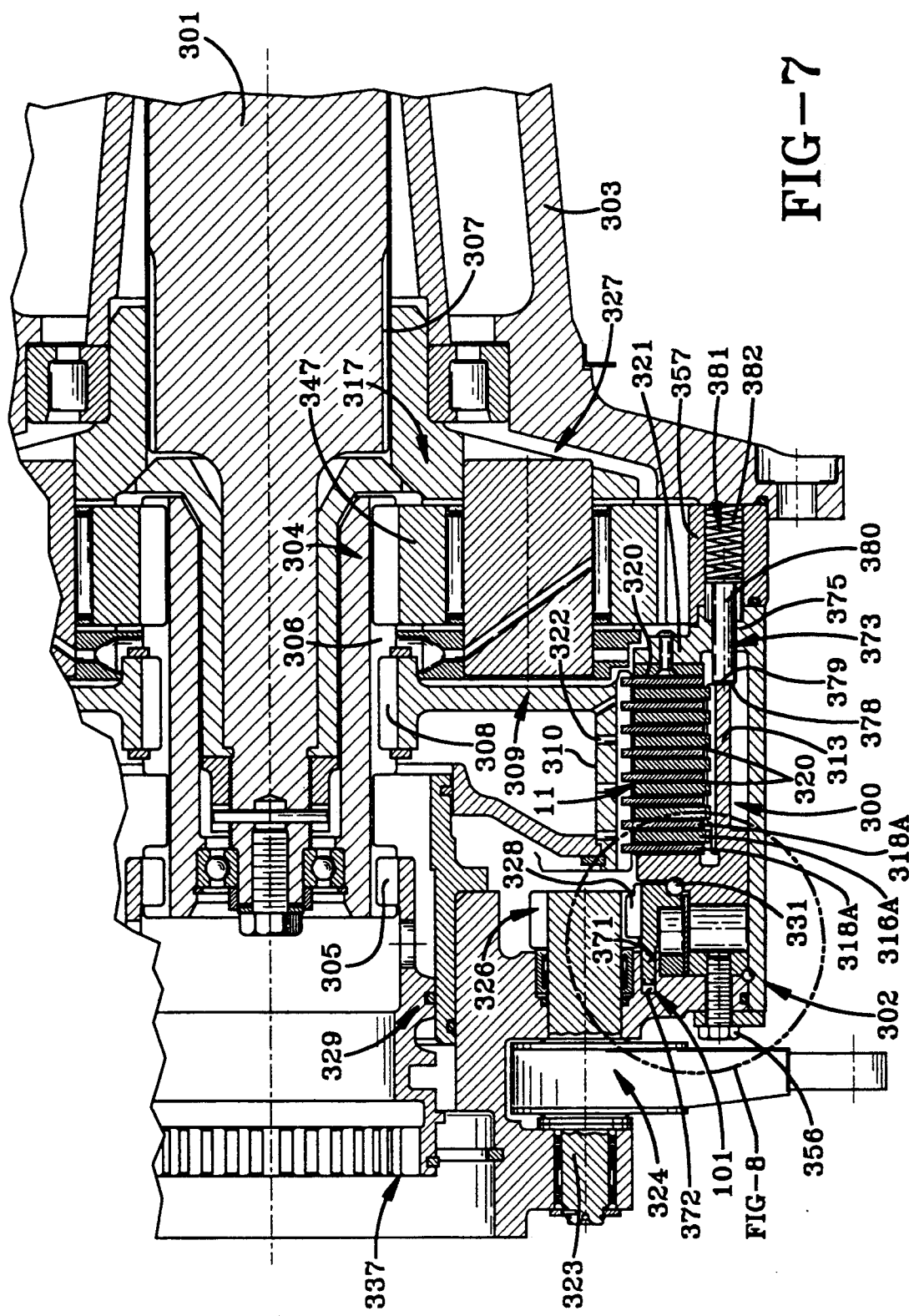
FIG. 7 is a schematic cross section taken axially through that portion of a transmission case which houses a brake assembly that acts upon the transmission output shaft in proximity to its connection with an axle assembly of a vehicle, the cross section depicting a representative brake apply assembly employing opposed camming ramps to effect the mechanical actuation of the brake pack and an actuating cylinder to effect hydraulic actuation of the brake pack, the mechanical and hydraulic actuating systems being compatibly cooperative.

The brake pack 11 is operatively connected between the hub member 309 and a brake apply annulus 312. Specifically, the radially inner surface on the skirt portion 313 of the brake apply annulus 312 may incorporate splines, in the nature of axial slots, as at 314, to receive the mating splines, in the nature of tangs, 315 of the first, annular, reaction torque plates 316 and thereby assure that the first torque plates 316 are not relatively rotatable with respect to the brake apply annulus 312. To assure that the interaction between the brake apply annulus 312 and the splines 315 is sufficient to withstand the loading to which the splines 315 may be subjected, a plurality of axially oriented splines, or slots, 314 are employed at circumferentially spaced intervals about the radially inner surface on the skirt portion 313 of the brake apply annulus 312, and the first torque plates 316 are provided with a sufficient number of tang splines 315 to interact with those slot splines 314, as is well known to the art. For simplification of the exploded perspectives only two torque plates 316 are depicted in FIGS. 9 and 10, but as should be appreciated, a plurality of such plates 316 may be stacked in operative relation with the hereinafter described second, torque plates 318, as is also well known to the art. As depicted in FIG. 7, seven, first—or reaction—torque plates 316 are interleaved with eight, second—or drive—torque plates 318.

The splines 311 on the radially outer rim 310 of the hub member 309 are also spaced at circumferential intervals to receive the several splines, in the nature of tangs, 319 which extend radially inwardly from each of the plurality of second, annular torque plates 318 and thereby assure that the second torque plates 318 will not rotate relative to the hub member 309, and thus the transmission output shaft 301, as is also well known to the art.

Annular friction disks 320 are preferably interposed between each of the successive first and second torque plates 316 and 318, respectively. To assure that the several friction disks 320 will not be displaced when they are not compressed between the successive first and second torque plates 316 and 318, a friction disk 320 is, as a general rule, secured to both sides of the alternate first or second torque plates 316 or 318. By thus securing the friction disks 320 to only one of the torque plates 316 or 318 the chance of having any friction disk 320 directly engage another friction disk 320 is obviated. It is, of course, also possible to apply one friction disk 320 to only one side of each torque plate 316 and 318. In this arrangement care must be exercised to assure that only one friction disk is sandwiched between successive torque plates 316 and 318 in order to preclude direct engagement between friction disks 320.

Figure 8:
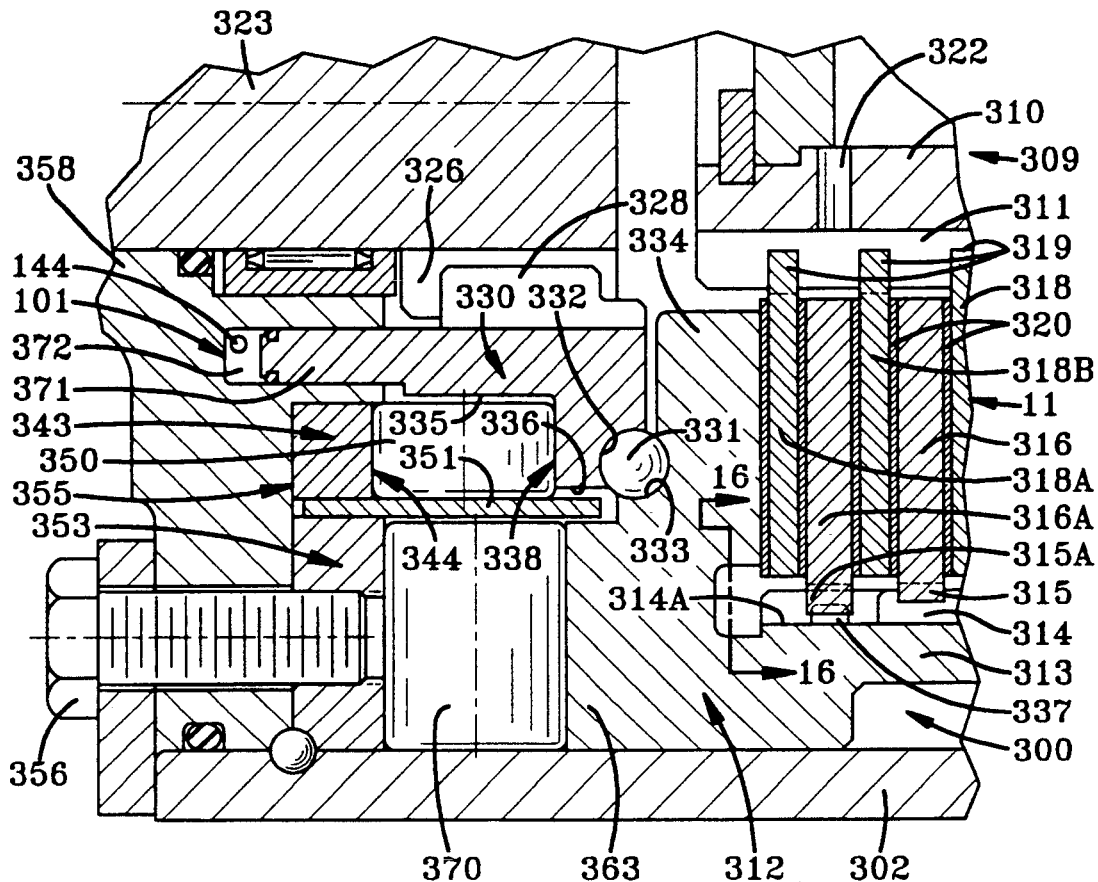
FIG. 8 is an enlarged area of that portion of the schematic cross section of FIG. 7 defined generally by the circle designated as "FIG-8" therein.
Figure 16:
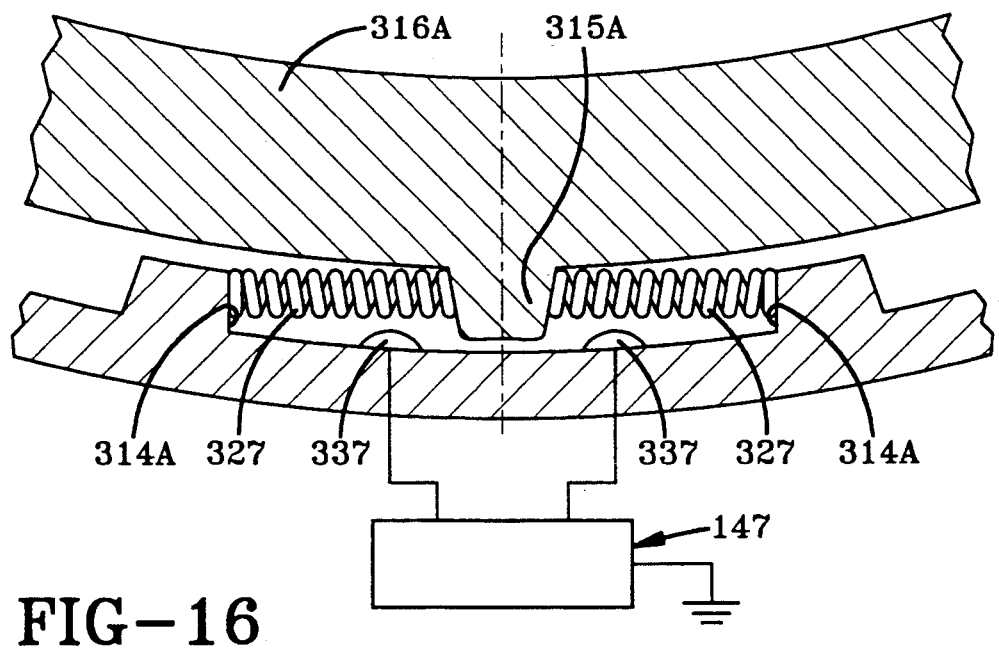
FIG. 16, which appears on the same sheet of drawings as FIG. 8, is a view taken along lines 16—16 of FIG. 8 and depicts the disposition of the electrical switches within the brake assembly; and, FIG. 17 is a diagrammatic representation of a mechanical actuating system which embodies the present invention.

As best seen in FIGS. 8, 9 and 16, the reaction torque plate 316A has tangs, or splines, 315A which are more widely spaced than the splines 315 on the remaining plates 316. The tangs 315A are aligned in elongated splines 314A such that some rotary travel, or displacement, between the plate 316A and the splines 314A is permitted. The tangs 315A of plate 316A are centered within the splines 314A by springs 327 which are disposed on opposite sides of the tang 315A and are compressed between the tang 315A and the adjacent splines 314A. The springs 327 prevent the tang 315A from inadvertently engaging a pair of switches 337 which are disposed within the spline 314A. These electrical switches 337 are operable to close the electric circuit such that the solenoid valve 147 will be operating thereby precluding communication of fluid pressure between passage 140 and passage 144. The plate 316A will remain centered by the springs 337 within the splines 314A until a reaction torque is imposed thereon by the plates 318A and 318B which span the plate 316A. The plates 318A and 318B rotate with the rim 310 of the hub member 309. When the brake apply valve 100 is initially opened, fluid pressure will be directed, by valve 147, to cause engagement of the brake. Torque will be transmitted between the plates 318A and 318B to the plate 316A resulting in relative rotation between the plate 316A and the brake apply annulus 312. This relative rotation will actuate the solenoid valve 147 such that passage 140 is disconnected and further pressure is supplied by valve 100 through passage 144. The brake 300 is hydraulically applied by fluid pressure operating on a piston 371 which is slidably disposed in a chamber 372. The brake apply valve 100 is generally operable to supply an operator-controlled input responsive brake pressure to passage 144 which is delivered to the chamber 372. Thus, under normal conditions the operating pressure in the chamber 372 is proportional to operator input. However, with the present invention it is possible to prefill the chamber 372 and the feed lines with a higher fluid pressure such that the hydraulic brake operation is initiated at a high pressure level. The apply pressure is then reduced to a pressure level more consistent with the desired braking affect of the operator. This permits a more consistent brake apply time and the operator perceives a consistent brake application regardless of the amount of operator force that is input through the control pedal 12.

An annular backing plate 321 (FIG. 7) is also preferably supported by the brake housing assembly 302 to provide a fixed member against which the brake pack 11 may be compressed. As shown, one of the friction disks 320 may also be secured to the backing plate 321. The specific interaction and operation of the structural members in the present brake apply assembly 300 by which that compression is effected will be hereinafter more fully explained.

As previously explained, a brake apply valve 100 provides a brake apply signal pressure to operate a brake coolant valve 200 which, as previously described, controls the application of a coolant—normally cooled hydraulic fluid available from the same source as the hydraulic fluid flowing to, or through, the brake apply valve 100—to the torque transfer devices employed in each brake pack 11. In the embodiment depicted, the torque plates 316 and 318 as well as the friction disks 320 constitute a brake pack 11. A plurality of ports 322 extend radially through the rim 310 of the hub member 309 to dispense the cooling fluid radially outwardly over the brake pack 11.

Focusing more specifically on the brake apply assembly 300, which includes the brake apply annulus 312, the apply shaft 323 is rotated—either directly with the actuating arm 113 (FIG. 1) or by an apply lever assembly 324 (FIGS. 7-10) which responds to the application of pressure-applied by the operator of the brake pedal 12 of the vehicle. As shown, the apply lever assembly 324, if employed, may be operatively secured to the apply shaft 323, as by a spline connection 325. In either event, a spur gear 326 is provided on the inboard end of the apply shaft 323 meshingly to engage the teeth 328 presented on the radially inner surface of an annular apply cam member 330. The axial orientation of the teeth on the spur gear 326, as well as the axial orientation of the teeth 328 on the annular apply cam member 330 permit relative axial movement therebetween, even while the teeth remain in meshing engagement. The ability of the annular apply cam member 330 to be readily displaced axially with respect to the apply shaft 323-while the two members remain in meshing engagement is quite important to the operation of the brake apply assembly 300 utilizing a toothed input mechanism, as will hereinafter become more fully apparent.

A plurality of ball bearings 331 are interposed between the race 332 (FIGS. 8 and 11) presented from the annular apply cam member 330 and the opposed race 333 provided radially inwardly directed flange 334 on the brake apply annulus 312. As will be hereinafter more fully explained, the ball bearings 331 will effect axial force transfer between the annular apply cam member 330 and the brake apply annulus 312, even though those two components are relatively rotatable. As will be hereinafter described, axial translation of the annular apply cam member 330, for any reason, will, through the application of axial force by the ball bearings 331, tend to effect axial translation of the brake apply annulus 312.

Figure 11:
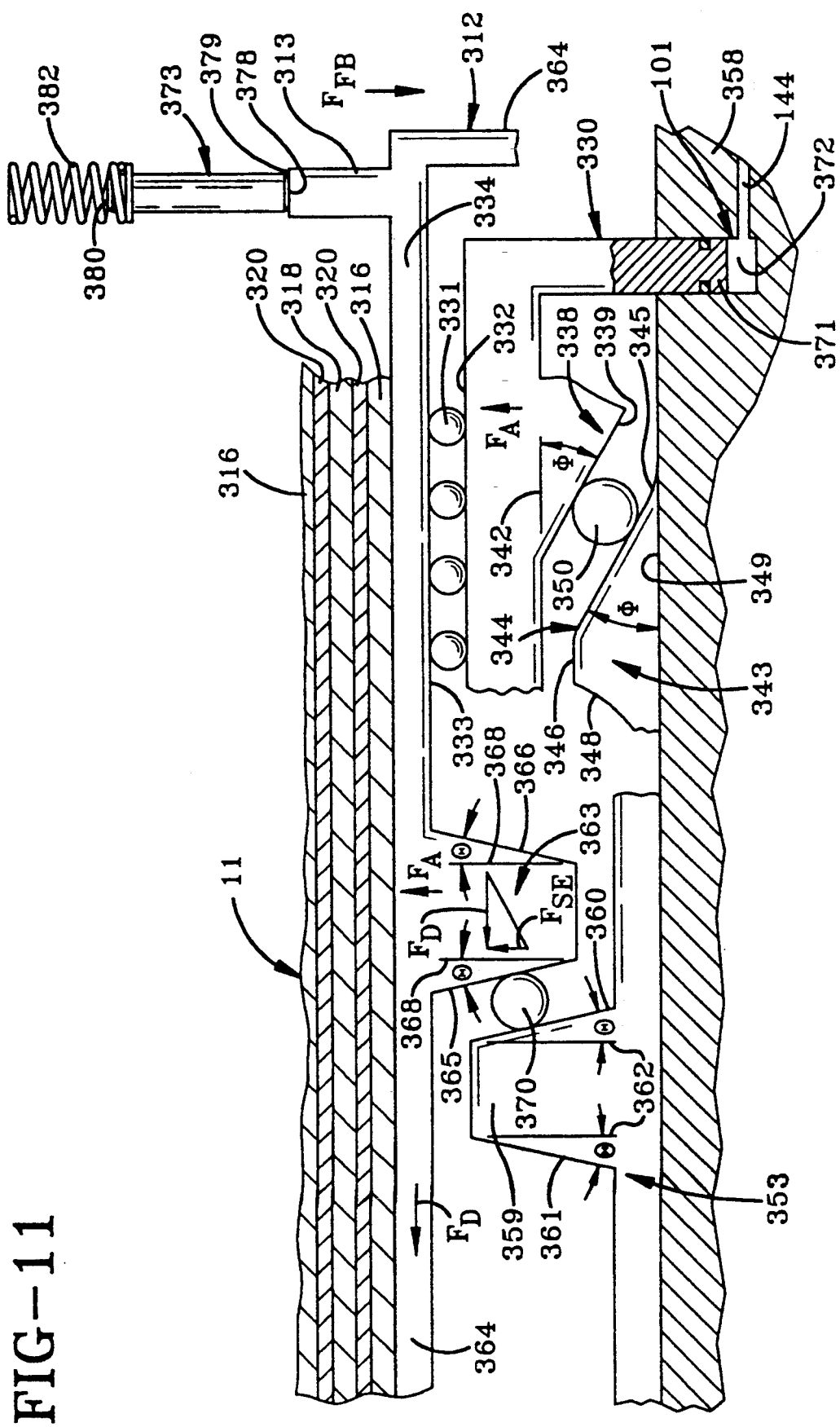
FIG. 11 is a schematic, elevational representation of a portion of the brake assembly to assist in explaining the self-energizing features of the brake assembly as well as the mathematical expressions which delineate that self-energization.

As best seen in FIGS. 9 and 10, the radially outwardly directed surface of the apply cam member 330 is defined by radially offset, cylindrical first and second surfaces 335 and 336, respectively. A camming surface, indicated generally by the numeral 338, extends radially between the first offset surface 335 and the second offset surface 336. The camming surface 338 is comprised of a plurality of axially inclined apply ramps 339—fifteen in the embodiment depicted—disposed between null peaks 340 and return surfaces 341 such that each apply ramp 339 is inclined at an angle Φ with respect to a circumferential frame of reference 342, as best seen in FIG. 11.

An annular reaction cam member 343 is disposed in axial opposition to the apply cam member 330. The reaction cam member 343 presents an axially disposed cam surface, identified generally by the numeral 344. The reaction cam surface 344 also comprises a plurality of axially inclined, reaction apply ramps 345—fifteen in the embodiment depicted—disposed between null peaks 346 and return surfaces 348 such that each reaction apply ramp 345 is also inclined at an angle Φ with respect to a circumferential frame of reference 349 which is disposed in parallel relation to the circumferential frame of reference 342 on the annular apply cam member 330, as best seen in FIG. 11. One apply roller 350 is disposed between each of the opposed apply ramps 339 and 345 on the apply cam member 330 and the reaction cam member 343, respectively, for a purpose more fully hereinafter described.

A containing skirt 351 extends circumferentially about the reaction cam member 343. The reaction cam member 343, with the containing skirt 351 positioned circumferentially thereabout, is received within the central operating 352 through a response ring 353. A plurality of pins 354 extend radially through the response ring 353, the containing skirt 351 and into the reaction cam member 343 in order to secure those members into a single reaction assembly 355. A plurality of fastening means in the nature of machine bolts 356 (FIGS. 7 and 8) extend through the end wall 358 of the brake housing 302 to be anchored in the response ring 353, thereby securing the reaction assembly 355 to the brake housing 302.

The response ring 353 presents a plurality of circumferentially spaced, axially outwardly extending lobes 359. As depicted, sixteen lobes 359 would represent a typical embodiment. The opposed sides of each successive lobe 359 presents preferably planar self-energizing ramps 360 and 361 that are each inclined at an angle Φ with respect to an axial frame of reference 362, as represented in FIG. 11. An equal number of virtually identical lobes 363 extend axially outwardly at circumferentially spaced locations about the outer rim 364 of the brake apply annulus 312. The opposed sides of each successive lobe 363 also presents preferably planar self-energizing ramps 365 and 366 that are also inclined at an angle Φ with respect to an axial frame of reference 368 thereon, as represented in FIG. 11, which is substantially parallel with the axial frame of reference 362 on the response ring 353. There are preferably the same number of lobes 363 on the brake apply annulus 312 as the number of lobes 359 on the response ring 353, although the lobes 359 on the response ring 353 are circumferentially displaced with respect to the lobes 363 on the brake apply annulus 312. This circumferential displacement positions the self-energizing ramp 360 on each lobe 359 in opposition to the self-energizing ramp 365 on lobe 363. Similarly, the self-energizing ramp 361 on lobe 359 is thereby disposed in opposition to the self-energizing ramp 366 on lobe 363. A roller 370 is disposed between each pair of opposed self-energizing ramps 359 and 365 as well as each pair of opposed self-energizing ramps 361 and 366 on the successive lobes 359 and 363.

As best seen in FIGS. 8, 9 and 10, the annular piston 371 extends axially outwardly from the apply cam member 330 to be received within the mating, annular piston chamber 372 recessed within the end wall 358 of the brake housing 302. A similar piston chamber is provided for that brake apply assembly 300 utilized with each transmission output shaft 301. As previously described, pressurized hydraulic fluid is applied from the brake apply valve 100 to the brake cylinders 101 through the feed conduit 144.

A plurality of displacement rods 373 are slidably received within a corresponding plurality of bores 374 circumferentially spaced about a support flange 375 that extends radially inwardly from the brake housing 302. The bores 374 may, as shown, alternate with mounting bores 376 which also penetrate the support flange 375. The previously described annular backing plate 321 may also be carried on the support flange 375.

The distal end 378 of each displacement rod 373 extends outwardly from the support flange 375 to engage the end face 379 on the skirt portion 313 of the brake apply annulus 312. The opposite, or proximal, end 380 of each displacement rod 373 is received within a chamber 381 for axial displacement. The chamber 381 contains means by which to provide a biasing protraction of the displacement rod 373 against the end face 379 on the skirt portion 313 of the brake apply annulus 312. As shown, that means may be the biasing action of a compression spring 382, but for some installations the chamber 381 may serve to receive pressurized hydraulic fluid, the pressure of which will control the force with which the displacement rod 373 acts against axial translation of the brake apply annulus 312.

Operation of the brake apply assembly 300 is initiated when the vehicle operator applies pressure to the brake pedal 12, which effects rotation of the apply shaft 323, either directly—or by virtue of a force transfer means, not shown, to the apply lever assembly 324. Rotation of the shaft 323, and the spur gear 326 secured thereto, rotates the annular apply cam member 330 and forces the apply ramps 339 to drive the apply rollers 350 against the reaction apply ramps 345 on the reaction cam member 343. Because the reaction cam member 343 is fixedly secured to the brake housing 302, the interaction between the apply ramps 339, the apply rollers 350 and the reaction apply ramps 345 translates the annular apply cam member 330 away from the reaction cam member 343 to drive the ball bearings 331 against radially inwardly directed flange 334 on the brake apply annulus 312, thus also axially translating the brake apply annulus 312 to compresses the associated brake pack 11 between the flange 334 and the backing plate 321.

As the braking action between the interleaved torque plates 316 and 318 begins to take effect, the torque applied to those torque plates 318 rotating with the transmission output shaft 301 by virtue of the vehicular momentum is reflected back to the brake apply annulus 312. The torque is reflected through the interaction of the splines 315 on the first torque plates 316 with the splines 314 on the skirt portion 313 of the brake apply annulus 312. The resulting torque reaction is not, however, applied to the annular apply cam member 330 inasmuch as the ball bearings 331 isolate the annular apply cam member 330 from rotation of the brake apply annulus 312. To the contrary, the torque feed back to the brake apply annulus 312 does react against those rollers 370 located between the ramps 365 or 366 on the lobes 363 of the brake apply annulus 312 which are, by the reflected torque, rotated toward the opposed ramps 360 or 361 on the lobes 359 presented from the response ring 353. The resulting interaction of the ramps on lobes 359, the rollers 370 and the reaction ramps on lobes 363 effects an additional translation of the annular apply cam member 330 away from the reaction cam member 343. This translation also serves to drive the ball bearings 331 against the radially inwardly directed flange 334 on the brake apply annulus 312, thus effecting additional axial translation of the brake apply annulus 312 to compresses the associated brake pack 11 even further. The brake application resulting from the feed-back torque is designated as a self-energizing braking application, and its effect is additive to the brake apply force initially generated by rotation of the annular apply cam member 330.

With continued reference to FIG. 11, an in-depth understanding as to the operation of the mechanical brake apply assembly 300 can be achieved by understanding certain mathematical relationships generated by that assembly. The following mathematical terms are employed to express the mathematical relationships:

$F_A$ = The translation force applied by the brake apply annulus 312 in response to the interaction of the annular apply cam member 330 to the brake apply annulus 312 through the apply rollers 350;

$F_{SE}$ = The self energizing force applied to the brake apply annulus 312 in response to the interaction of the lobes 359 on the response ring 353 with the lobes 363 on the brake apply annulus 312 through the rollers 370;

$F_D$ = The drag force resulting by virtue of the vehicular momentum feed-back from the brake pack 11;

$F_C$ = The total clamping force applied to the brake pack 11, which can be mathematical expressed as:

$$F_C = F_A + F_{SE} - F_{FB} \qquad (1)$$

In order to calculate the total amount of axial clamping force $F_C$ required to generate a braking torque "T", one needs the following additional mathematical terms:

$\mu$ = The coefficient of friction between the torque plates 316 and 318 and the interleaved friction disks 320;

$R_{FP}$ = The mean radius of the friction disks 320; and,

N = The number of friction disks 320.

The axial clamping force $F_C$ can then be calculated by the mathematical expression:

$$F_C = \frac{6T}{(\mu)(R_{FP})(N)} \qquad (2)$$

In order to calculate the self-energizing force $F_{SE}$ generated by that torque, one needs the following additional mathematical terms:

$R_{SE}$ = The radius to the center of the self-energizing rollers 370; and, $\Theta$ = The angle of inclination of the self-energizing ramps 360 and 365 in one direction and 361 and 366 in the other direction.

The self-energizing force $F_{SE}$ can then be calculated by the following mathematical expression:

$$F_{SE} = \frac{12T}{(R_{SE})(\cot\theta)} \qquad (3)$$

Finally, one must determine the angle $\Theta$ at which the system will not release—i.e.: the locking angle. The locking angle is the self-energizing ramp angle of inclination $\Theta$ that results in a self energizing force equal to the total force required to sustain the braking torque. In order for the system to release, the braking force must release when the apply force is removed. Otherwise, the brakes would lock every time the brakes were applied and would not release until the vehicle would be brought to a complete stop. Similarly, if the brakes were applied when the vehicle was on a grade, the brakes could not be released without moving the vehicle up the grade. As such, the locking angle $\Theta$ is achieved whenever:

$$F_{SE} = F_C \quad (4)$$

Expanding the foregoing mathematical expression, it will be observed that:

$$\frac{12T}{(R_{SE})(\cot\theta)} = \frac{6T}{(\mu)(R_{FP})(N)} \quad (5)$$

Simplifying, $$\cot\theta = 2N(\mu)\left(\frac{R_P}{R_{SE}}\right) \quad (6)$$

The percentage of self-energization of a system is defined as that percentage of the total apply force that is provided by the self-energization feature. Typically, one would employ something in the range of about thirty percent (30%) self-energization. That is seventy percent (70%) of the clamping force would be derived from the pressure applied to the brake pedal 12 and thirty percent (30%) of the clamping force would be self generated from the system itself.

The higher the ratio of the self-energization braking force with respect to the mechanical apply force applied by the operator through the input mechanism (such as the brake pedal 12), the more difficult the system is to control. That is, a large change in the total clamping force resulting from a small change in the mechanical apply force normally introduces a degree of instability. For that reason, the percentage of self-energization is kept well below fifty percent (50%), with a resulting apply force advantage of below 2:1. Such a ratio generates sufficient total clamping force, but it requires that a reasonable comparable pedal force be applied by the vehicle operator.

The present system is designed to take advantage of the self-energization feature, and yet limit the amount of self-energization to a desired range. This result is accomplished primarily by selection of the inclination angle that is appropriately less than the locking angle $\Theta$. For example, in a representative embodiment wherein the locking angle $\Theta$ is calculated to be 27.5 degrees, the actual angle selected would be on the order of about 13 degrees in order to utilize only about fifty percent (50%) of the self-energization feature. Even so, the brake pedal effort required to stop the vehicle under all conditions is greatly reduced.

The apply system would be designed to impose an equal force to the annular apply cam member 330 associated with each axle, that force being proportional to the pedal force and the linear stroke of the pedal 12. The displacement stroke of the pedal 12 adjusts the total force applied to the brake packs 11 to attain a deceleration rate compatible with the tactile feed back to the vehicle operator through the brake pedal 12. The biasing pressure applied to the proximal end 380 of the displacement rods 373 acts against the mechanical force applied by the self-energization system to assure its release when the pressure applied against the brake pedal 12 by the vehicle operator is release, or reduced.

The biasing force supplied by the springs 382 does not relieve the apply system 300 of any of its load inasmuch as that biasing force is applied to the isolated brake apply annulus 312 and not to the annular apply cam member 330. Hence, the biasing force relieves a portion of the self energizing force at the rollers 370 but does not measurably affect the position of the brake apply annulus 312. This results in a continuous force versus displacement curve at the pedal in order to eliminate the "hump" in the apply schedule existing in the prior art systems.

It must be appreciated that if the hydraulic system were to fail, the mechanical system would only be modestly opposed by the biasing action of the springs 382 so that the vehicle could readily be brought to a stop—although at perhaps a somewhat greater pedal pressure than would normally be required. Finally, holding a vehicle on a grade with the engine off (no hydraulic system assist) would take advantage of the self-energization feature.

Modulator Signal Valve

With reference generally to FIG. 1 and, for more detail, to FIGS. 12 through 17, the modulator signal valve 400 employs a spool member 401 having lands 402 and 403 of different diameters. The first, or control, land 402 is of smaller diameter than the second, or valving, land 403 and is axially slidable within a cylindrical, spool actuating bore 404 that opens into an actuating chamber 405. A computerized control member 13 communicates with the actuating chamber 405 by virtue of a control pressure feed conduit 406 that opens to the actuating chamber 405 through a port 408 that penetrates the cylindrical interior surface of the bore 404.

The computerized control member 13, as is well known, typically includes a regulator valve (not shown) that transmits a throttle responsive control pressure through control pressure feed conduit 406 in response to throttle position—the control pressure being proportional to the degree to which the throttle is opened. In such arrangements the maximum control pressure is supplied by the modulator valve in response to the closed throttle—e.g.: a pressure on the order of 35 pounds per square inch (0.2415 MPa)—and the minimum modulator valve control pressure is supplied in response to full throttle —e.g.: as little as zero pounds per square inch (zero MPa). This control pressure is fed to the modulator signal valve 400 through the control pressure feed conduit 406 as the throttle responsive control pressure.

A first lug 410 extends axially outwardly from the spool member 401 to engage the opposed, end wall 411 of the actuating chamber 405 to assure unrestricted exposure of at least a portion of the first, or control, land 402 to the fluid pressure within the actuating chamber 405.

The second, or valving, land 403 is disposed in axially spaced relation to the first land 402, and as such, the second land 403 is axially slidable within a cylindrical, spool valving bore 412 that is coaxially aligned with the spool actuating bore 404. A directing chamber 413 is provided between the first and second lands 402 and 403. The longitudinal spacing of the lands 402 and 403, and the axial translation of the spool member 401, are such that the directing chamber 413 remains in continuous communication with a transfer conduit 414. As depicted, the transfer conduit 414 opens to the directing chamber 413 through a transfer port 415 that is located at the juncture of the spool valving bore 412 with the spool actuating bore 404. A third branch $150_C$ of the main pressure supply conduit 150 communicates with the spool valving bore 412 in spaced axial relation relative to the transfer port 415, to open into the directing chamber 413 through an inlet port 418 when the spool member 401 is disposed as depicted in FIG. 12.

Figure 12:
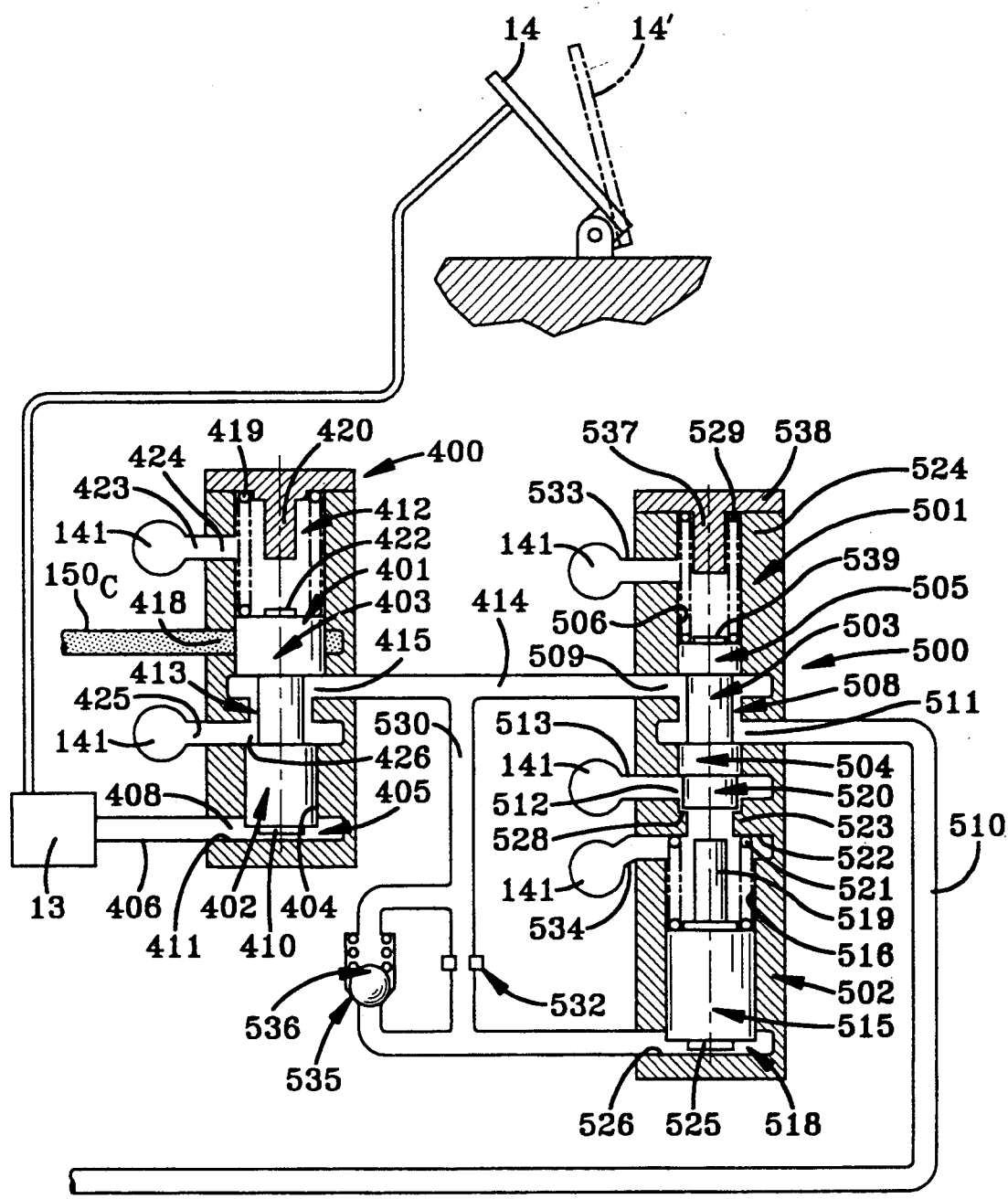
FIG. 12 is an enlarged portion of FIG. 1 depicting a modulator signal valve and the combined cut-off/timer valve assembly in schematic, axial cross section.

The spool valving bore 412 extends axially beyond the second, or valving, land 403 to house a compression spring 4 19 that serves to bias the first lug 410 toward engagement with the opposed end wall 411 of the actuating chamber 405, thereby tending to maintain the spool member 401 in the position depicted in FIGS. 1 and 12 until the spool member 401 has been otherwise actuated. With primary reference to FIG. 12, a locating pin 420 extends axially outwardly from the end cap 421 of the spool valving bore 412 in opposed registry with a second lug 422 that extends axially outwardly from the modulator spool member 401. Engagement of the locating pin 420 with the second lug 422 defines the maximum extent to which the modulator spool member 401 can be axially translated against the biasing action of the compression spring 419.

In order to assure that translation of the modulator spool member 401 is resisted solely by the action of the compression spring 419, the spool valving bore 412 communicates with the hydraulic return system 141 through an exhaust conduit 423 that opens through port 424 in the cylindrical surface 416.

The directing chamber 413 also communicates with the hydraulic return system 141. As depicted, a conduit 425 opens through exhaust port 426 in the spool actuating bore 404 to communicate with the hydraulic return system 141.

Cut-off/Timer Valve Assembly

The modulator signal valve 400 operatively communicates with a combined cut-off/timer valve assembly 500. The valve assembly 500 has a cut-off valve portion 501 that cooperatively interacts with a timer valve portion 502.

The cut-off valve portion 501 may employ a cut-off spool valve member 503 having a pair of axially spaced, first and second lands 504 and 505 which cooperatively engage the interior of a cylindrical valve bore 506 to define a transfer chamber 508 between the first and second lands 504 and 505, respectively. As depicted generally in FIG. 1, and with greater specificity in FIG. 12, the transfer conduit 414, which communicates with the directing chamber 413 in the modulator signal valve 400, also communicates with the transfer chamber 508 through an inlet port 509 that penetrates the cylindrical valve bore 506. A throttle release, or pre-cooling, signal conduit 510 communicates with the transfer chamber 508 through an outlet port 511. The outlet port 511 is located in proximity to the first land. 504 when the cut-off spool valve member 503 is disposed as depicted in FIGS. 1 and 12. A discharge port 512 opens into the cylindrical bore 506 on the other side of the first land 504 and serves to effect communication with the hydraulic return system 141 through conduit 513.

The timer valve portion 502 has a piston 515 that is slidably received within a piston bore 516 that opens to an accumulator chamber 518. A piston rod 519 extends axially outwardly from the piston 515 to be engageable with a head 520 that extends axially outwardly from the spool member 503 in the cut-off valve portion 501. A compression spring 521 circumscribes the piston rod 519 and acts between the piston 5 15 and one side 522 of a reaction shelf 523 on that portion of the housing 524 which contains the cut-off/timer valve assembly 500. The spring 521 continuously biases a spacer lug 525 on the piston 515 into engagement with the opposed wall 526 of the accumulator chamber 518. By thus spacing the piston 515 from the opposed wall 526 unrestricted exposure of at least a portion of the piston 515 to the fluid within the chamber 518 is assured, even when the compression spring 521 has biased the piston 515 to its maximum disposition, as depicted in FIG. 1.

The head 520 on the cut-off spool valve member 503 is biased into engagement with a shoulder 528 on the reaction shelf 523, as by a compression spring 529 received within the cylindrical valve bore 506. The spring 529 thus biasingly urges the cut-off spool member 503 to maintain the transfer chamber 508 in communication with both the transfer conduit 414 and the throttle release signal feed conduit 510.

A branch conduit 530 leads from the transfer conduit 414 to the accumulator chamber 518. Pressurized signal fluid is fed through the branch conduit 530 into the accumulator chamber 518 in order to act against the piston 515 and displace it against the biasing pressure supplied by the compression spring 521. However, the pressurized fluid within the branch conduit 530 must pass through a restricting orifice 532 in order to reach the accumulator chamber 518. The restricting orifice 532 can be designed to serve as a time delay that is responsive to the fluid pressure anticipated in the branch conduit 530 during normal operation of the vehicle. Typically, a one to two second period of time will be desired between translation of the valving land 403 to open port 418 in the modulator signal valve. 400 and displacement of the piston 515 in the cut-off/timer valve assembly 500 to close the transfer chamber 508 to the admission of throttle release signal pressure to the signal feed conduit 510.

Opening the port 418 admits throttle release signal pressure into the directing chamber 413 that will be transmitted to and through the transfer chamber 508 and the feed conduit 510 to the piston chamber 210 in the brake coolant valve 200. Subsequent displacement of the piston 515 in response to fluid pressure within the accumulator chamber 518 of sufficient magnitude to overcome the biasing action of spring 521 effects closure of the transfer chamber 508 to the transfer conduit 414 and opens the transfer chamber 508 to the hydraulic return system 141 through the discharge port 512, and conduit 513.

In order to ensure that the cut-off spool valve member 503 and the piston 515 are not undesirably restricted in their movement by the existence of entrappeal hydraulic fluid, conduit 533 effects communication between the hydraulic return system 141 and the valve bore 506, and conduit 534 effects communication between the hydraulic return system 141 and the piston bore 516.

Figure 14:
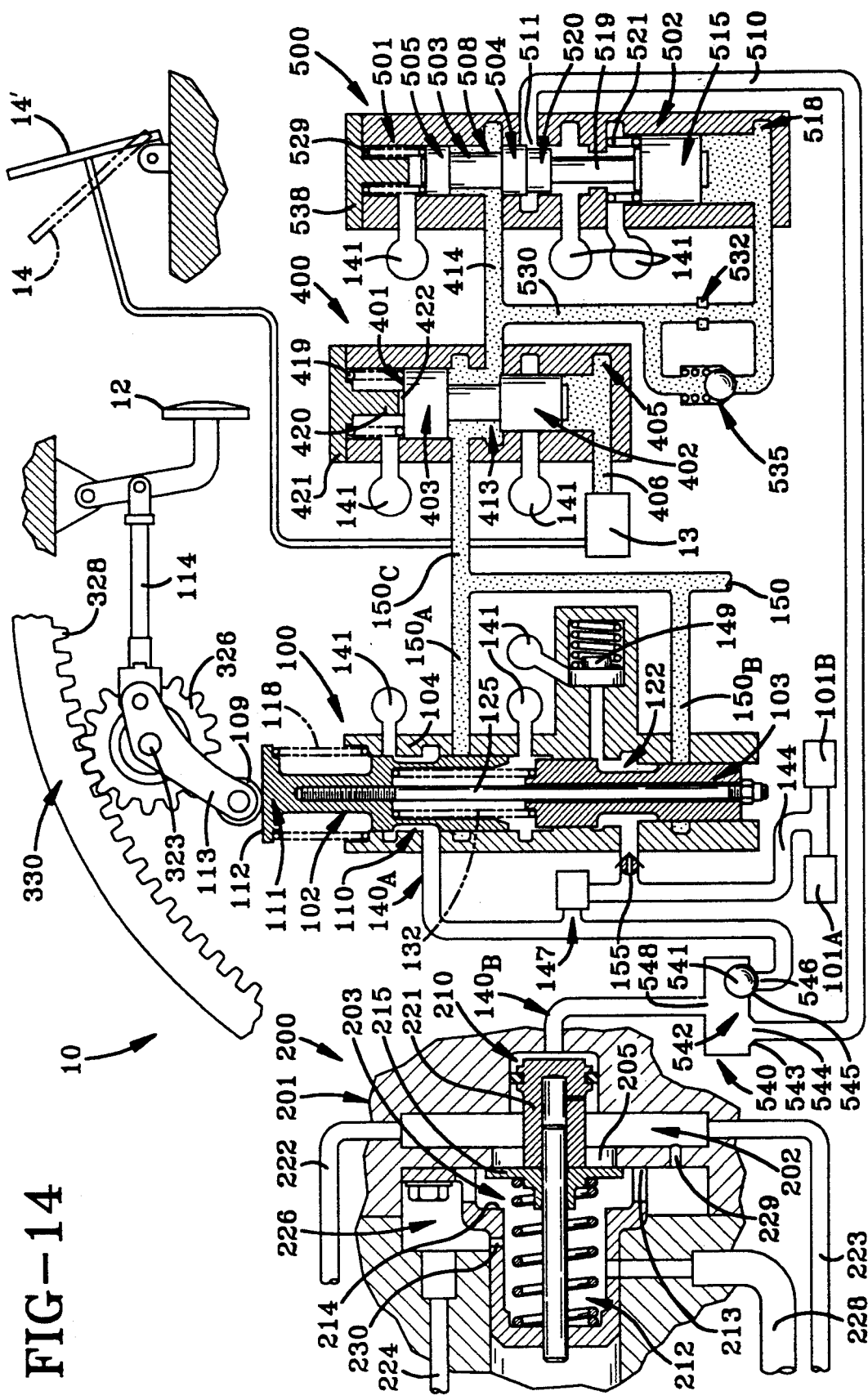
FIG. 14 is a view similar to FIGS. 1 and 13, but depicting actuation of the timer valve portion sufficient to close the cut-off valve portion.

Translation of the cut-off spool valve member 503 by piston 515 against the biasing action of spring 529 may be limited by providing a locating pin 537 on an end cap 538 of the housing 524. The locating pin 537 is engaged by an opposed stop extension 539 on the valve member 503 to determine the axial limit to which the spool valve member 503 can be translated in response to translation of the piston 515, as depicted in FIG. 14. The stop extension 539 can also serve as a centering pedestal for the spring 529.

It should also be noted that a unidirectional by-pass 535 is employed in the branch conduit 530—in parallel with the restricting orifice 532. The by-pass 535 may, as shown, employ a spring biased check valve mechanism 536 that permits rapid depressurization of the accumulator chamber 518 in response to a reduction of the pressure within the transfer conduit 414, as will be hereinafter more fully described.

Finally, the throttle release signal feed conduit 510 which communicates with the transfer chamber 508 through the outlet port 511, terminates in a ball-type shuttle valve 540 that is interposed at a convenient location along the brake apply signal feed conduit 140 which communicates between the brake signal chamber 110 in the brake apply valve 100 and the piston chamber 210 in the brake coolant valve 200. The shuttle valve 540 employs a ball 541 that is movable within a chamber 542. The ball 541 is receivable in a first seat 543 that surrounds a first port 544 through which the throttle release signal feed conduit 510 enters the chamber 542, or the ball 541 is receivable in a second seat 545 that surrounds a second port 546 through which the signal feed conduit $140_A$ opens to chamber 542. The second portion $140_B$ of the brake apply signal feed conduit 140, which communicates with the piston chamber 210 in the brake coolant valve 200, also communicates with the chamber 542 through a third port 548. The ball 541 is not designed to close the third port 548.

Operation

As the vehicle is moving along, with the throttle applied (i.e.: the throttle pedal is depressed to the position designated at 14 in FIG. 1), the throttle responsive control pressure supplied by the regulator valve (not shown) in the computerized control member 13 to the actuating chamber 405 of the modulator signal control valve 400 is insufficient to effect translation of the spool member 401. As such, the spring 419 maintains the spool member 401 in the position depicted in FIG. 1. Accordingly, any residual pressurized fluid within the accumulator chamber 518 will exhaust through the unidirectional by-pass 535, and the directing chamber 413, to enter the hydraulic return system 141 via the exhaust conduit 425 that opens to the directing chamber 4 13 through port 426 in the cylindrical surface of the bore 404. Similarly, any residual pressurized fluid within the piston chamber 210 of the brake coolant valve 200 will pass through portion $140_B$ of the brake apply signal feed conduit 140, the shuttle valve 540, the signal feed conduit 510, the transfer chamber 508 in the cut-off valve portion 501 and the transfer conduit 414 to enter the hydraulic return system 141, also through the exhaust conduit 425 which leads from the directing chamber 413.

Should the driver allow the throttle to close to that degree which would cause the pressurized fluid entering the actuating chamber 405 to overcome the biasing action of spring 419, as by lifting his foot from the throttle pedal such that it returns to the position represented at 14', the modulator spool member 401 will translate against the biasing action of the compression spring 419 such that the control land 402 closes port 426 to preclude further access to the hydraulic return system 141 through the directing chamber 413. Momentarily later, the valving land 403 opens port 418 to admit main pressurized fluid into the directing chamber 413.

Figure 13:
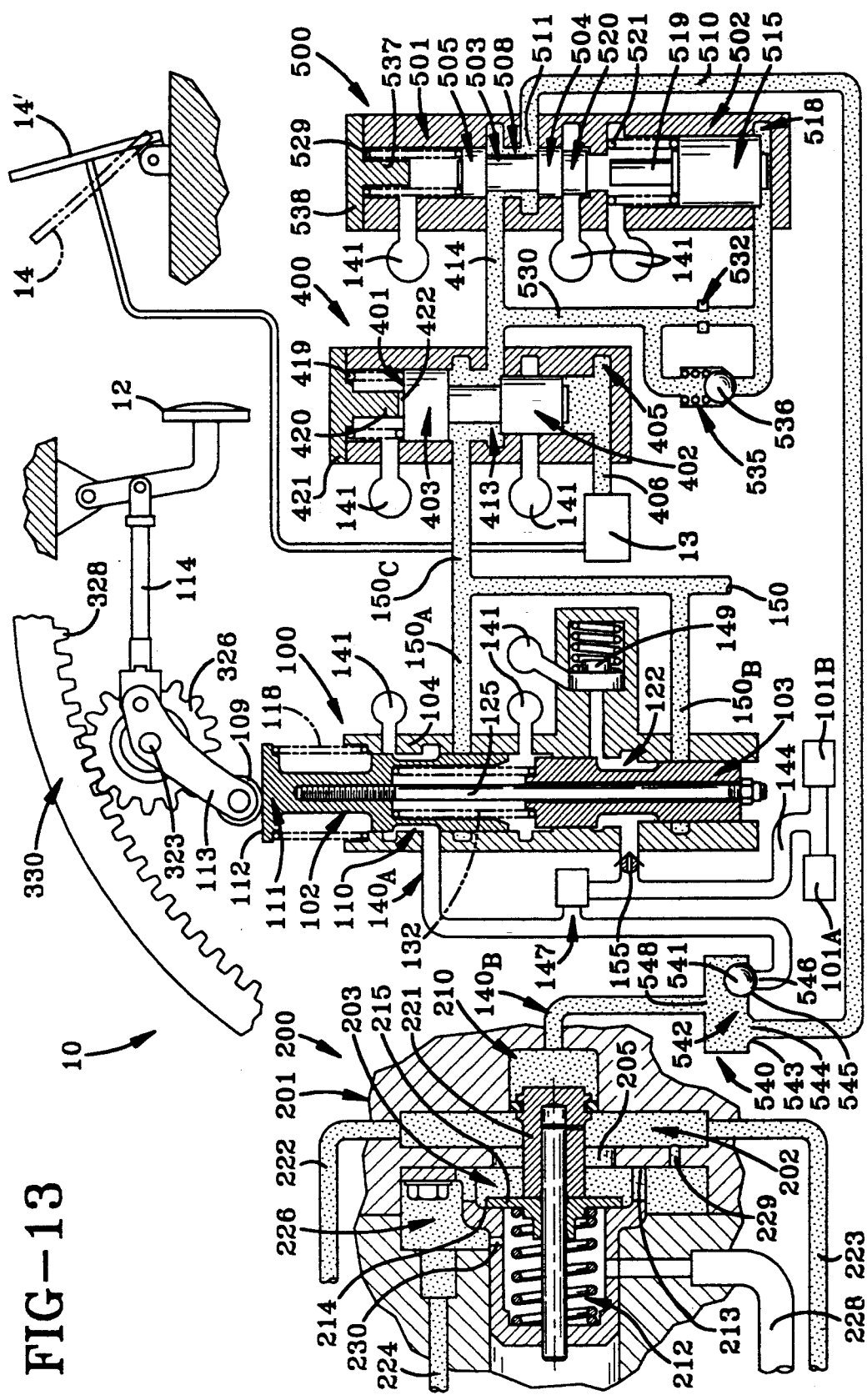
FIG. 13 is a view similar to FIG. 1, but with the modulator signal valve having been translated by control pressure within the actuating chamber to admit fluid under mainline pressure into the directing chamber.

Thus, when the biasing force supplied by the compression spring 419 is overcome by the pressure applied against the control land 402 by the fluid within the actuating chamber 405, the modulator spool member 401 will be moved to the position depicted in FIG. 13. With the modulator spool member 401 so positioned pressurized fluid may enter the direction chamber 413 from branch conduit $150_C$ without restriction and continue to flow, as throttle release signal pressure, through the transfer chamber 508 in the cut-off valve portion 501 and continue, unrestricted through the signal feed conduit 510, the shuttle valve 540, portion $140_B$ of the brake apply signal feed conduit 140 and into the piston chamber 210 in the brake coolant valve 200, thereby permitting the brake cooling fluid to bath the brake packs 11 in preparation for the application of the brakes. The operation of the brake coolant valve 200 was described in detail in conjunction with the description of the brake coolant valve 200 herein, but the stippling in FIG. 13 depicts the flow of pressurized fluid through the system in response to the reduction of foot pressure on the throttle pedal 14.

With the system components disposed as shown in FIG. 13 one of two subsequent operation will be effected. Either the brakes will be applied or they will not be applied. To consider each alternative separately, let us first explore the operation of the combined cut-off/timer valve assembly 500 if the brakes are not applied.

Pressurized signal fluid within transfer conduit 414 will pass into the branch conduit 530 and through the restricting orifice 532. The orifice restriction is designed to assure a predetermined period of time before a sufficient volume of pressurized fluid can pass into the accumulator chamber 518 of the timer valve portion 502 in order to effect displacement of the piston 515 against the biasing action of the compression spring 521. That displacement of the piston translates the piston rod 519 into engagement with the head 520 on the cut-off valve spool member 503. Continued translation of the piston rod 519 effects translation of the first land 504 on the cut-off valve spool member 503 to the position depicted in FIG. 14, thereby terminating communication between the transfer conduit 414 and the throttle release signal feed conduit 510.

As the first land 504 moves across the outlet port 511, the outlet port 511 and the discharge port 512 will communicate across a portion of the valve bore 506, thus allowing the signal feed conduit 510 to communicate with the hydraulic return system 141 through discharge port 512. As previously noted, the restricting orifice 532 can be designed in conjunction with the pressure of the fluid in the branch conduit 530, and with the strength of the compression spring 521, in order to effect a one to two second delay between the initial application of even a maximum modulator control pressure to the modulator signal valve 400 and the closing of the cut-off valve portion 501. This is deemed to be a sufficient time within which to maintain the application of an initial pre-cooling bath to the brake packs 11.

Should the vehicle operator re-apply the throttle, that action would decrease the throttle responsive control pressure fed from the control member 13 to the actuating chamber 405 of the modulator signal valve 400. When that pressure is sufficiently decreased, the compression spring 419 will exceed the differential pressure applied against the lands 402 and 403 by the mainline pressure of the fluid within the directing chamber 413. The spring 419 will then translate the modulator spool member 401 such that the varying land 403 will close the port 418. Substantially simultaneously therewith the control land 402 will open the port 426 to permit the pressure reflected within the directing chamber 413 from the pressure of the fluid within the transfer conduit 414, and the conduit system still in communication with the transfer conduit 414, to exhaust to the hydraulic return system 141 through port 426.

Minor variations in throttle application have no affect. First, the strength of the spring 419 may be selected so that a control pressure of approximately 20 pounds per square inch (0.207 MPa) will be required to overcome the action of the spring 419. Conversely, when the modulator signal control valve 400 has been actuated the differential areas of the lands 402 and 403 will come into play. Because the projected area of the valving land 403 exposed to the directing chamber 413 is greater than the opposed, projected area of the control land 402, the pressure of the fluid within the directing chamber 413 will maintain the modulator pool member 401 firmly against the locating pin 420 until there is a significant drop in the pressure within the actuating chamber 405. To continue the example, the differential projected areas of the lands 402 and 403 in relation to the strength of the spring 419 is such that a reduction in the control pressure to approximately 20 pounds per square inch (0.207 MPa) will allow the modulator spool member 401 to be returned to the position depicted in FIG. 1 by the biasing action of spring 419. By requiring such a signal pressure to "reset" the modulator signal control valve 400, flutter, or cycling, is eliminated.

As soon as the signal pressure within the transfer conduit 414 is thus reduced, the timer valve portion 502 will reset. That is, the pressurized fluid within the accumulator chamber 518 will pass through the unidirectional by-pass 535 against the force applied by the compression spring 521. The spring 529 is then free to translate the spool member 503 in the cut-off valve portion 501 to drive the head 520 on the cut-off spool valve member 503 against the reaction shelf 523 in preparation for the next throttle reduction. At this point the components of the system 10 will all have returned to the positions depicted in FIG. 1.

Figure 17:
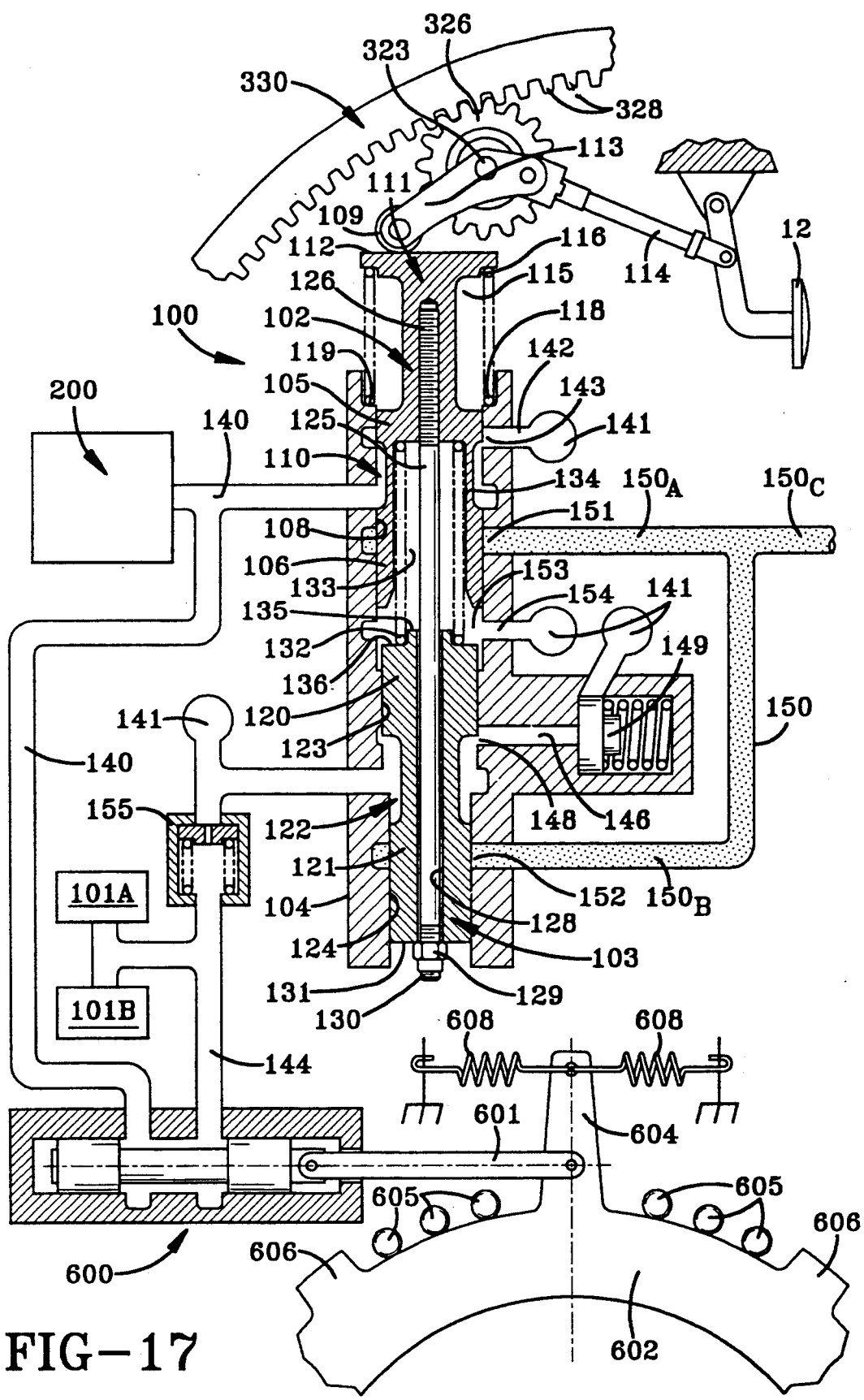

An alternative embodiment is shown in FIG. 17. In this embodiment a mechanical actuated valve 600 is slidably disposed in a bore which is in communication with the brake signal passage 140 and the brake apply passage 144. The brake apply passage 144 is, as previously described, separated from the brake apply valve 100 by a check valve 155 which has an orificed center portion to permit the pressure within passage 144 to be removed when required. The valve 600 is connected by link 601 to a brake reaction plate 602. The brake reaction plate 602 is positioned between a pair of driven brake plates such as 318A and 318B to establish a relative rotation between reaction plate 602 and the brake apply annulus 312. When the reaction plate 602 is utilized, an opening in the outer surface of the brake apply annulus 312 will be provided such that the reaction arm 604 will protrude outward from the brake assembly. The brake reaction plate 602 has disposed adjacent thereto a plurality of reaction pips 605 which are operable to be engaged by the torque arm 604 or by spaced spline members or tangs 606. These tangs 606 and the torque arms 604 in combination with the pins 605 will limit the relative rotary excursion, or displacement, of the reaction plate 602. The torque arm 604 is connected to the link 601 and therefore will cause movement of the valve 600 in response to relative movement of the reaction plate 602. The torque arms 604, and therefore reaction plate 602, is centered between the reaction pins 605 by a pair of springs 608 which are grounded to the brake housing. As shown, the valve 600 is disposed in an open condition and permits a free flow of fluid from the brake signal passage 140 to the brake apply passage 144. In this brake apply system when the signal pressure is first introduced, that is prior to the brake valve 100 being opened, the fluid pressure is directed via the passage 140 and 144 through the valve 600 to the brake apply piston 371. Thus, initial operation of the brakes will occur and the reaction force on the plate 603 will cause the torque arm 604 to actuate the valve 600 through the link 601 thereby closing the valve as torque reaction is established within the brake system. As shown, the hydraulic system will operate in conjunction with the mechanical system such that initial engagement of the brake will occur immediately upon either depression of the brake pedal or upon the introduction of proposed braking as a result of the operator releasing the throttle.

On the other hand, should the components be disposed as depicted in FIG. 13, and the vehicle operator would depress the brake pedal 12, the brake packs 11 will have been provided with a pre-cooling bath by the operation of the modulator regulating valve 400 operating in conjunction with the cut-off/timer valve assembly 500. Hence, as the brake pedal 12 is depressed, say to the position 12' depicted in FIG. 15, the brake apply valve 100 will be actuated by the initial displacement of the first spool member 102 to continue the flow of signal pressure from branch $150_A$, through the brake signal chamber 110, the conduit $140_A$ and into the chamber 542 of the shuttle valve 540. The signal pressure entering chamber 542 through port 546 will displace the ball 541 from the second seat 545. Because the ball 541 is not designed to close the third port 548, the pressurized signal fluid entering chamber 542 from either branch $140_A$ of the brake apply signal feed conduit 140 or the throttle release signal feed conduit 510 will flow through the branch $140_B$ to supply the piston chamber 210 in the brake coolant valve 200 and thereby assure that the brake coolant valve 200 will continue to supply the desired cooling bath to the brake packs 11.

Figure 15:
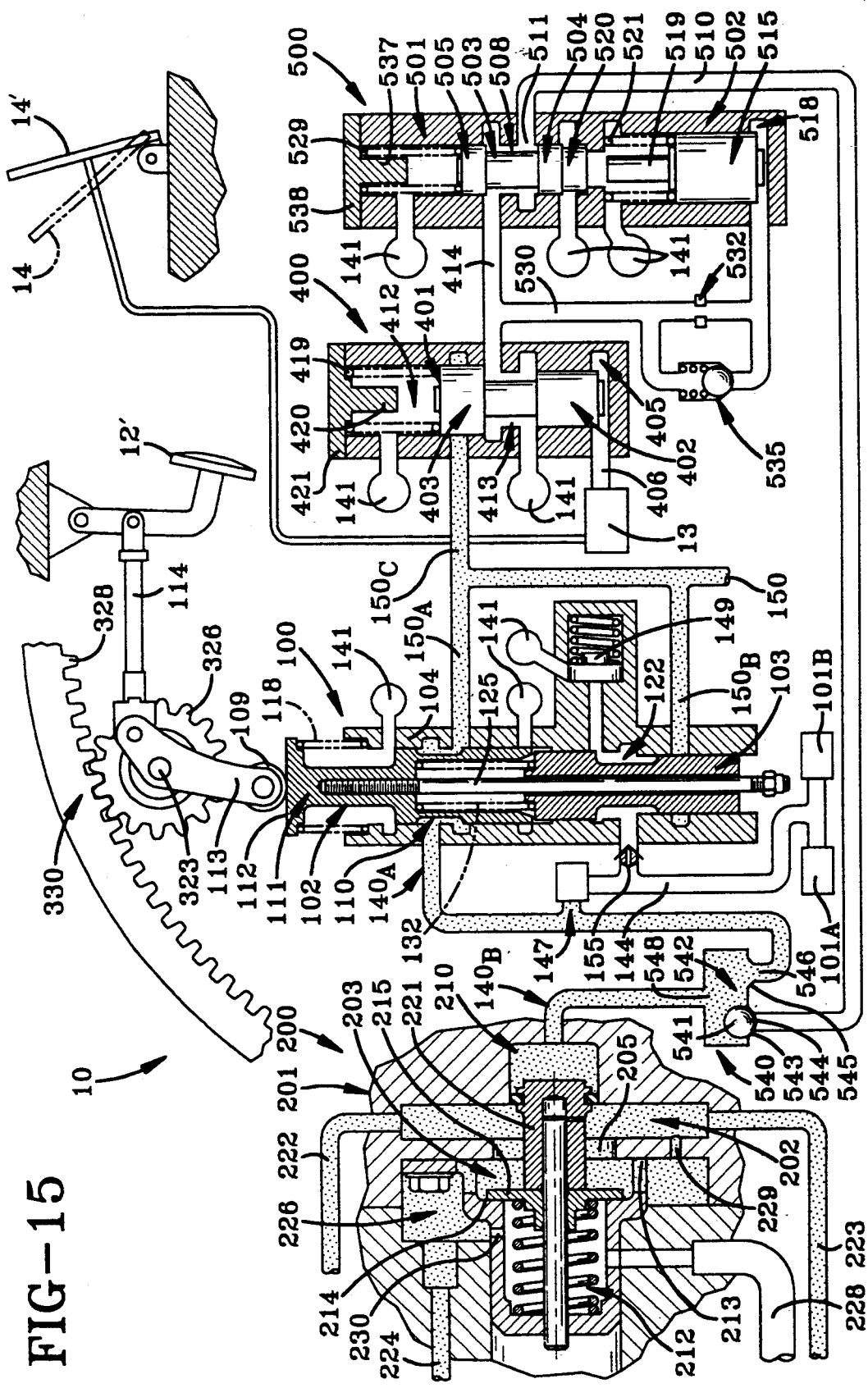
FIG. 15 is a view similar to FIGS. 1, 13 and 14, but depicting the modulator valve and the combined cut-off/timer valve assembly reset, and with the brake apply valve actuated to supply coolant to the brake packs.

During the initial actuation of the brake apply valve 100 the modulator signal valve 400 and the combined cut-off/timer valve assembly 500 will have "reset." Thus, the pressurized fluid in chamber 542 will attempt to discharge through the signal feed conduit 510—which then communicates with the hydraulic return system 141—but the drop in pressure between the chamber 542 and the signal feed conduit 510 will cause the ball 541 to be received on the first seat 543 to seal the port 544 and thereby preclude further flow of fluid from the chamber 542 into the signal feed conduit 510, as shown in FIG. 15.

Continued depression of the brake pedal, as to the position depicted at 12' will not only effect actuation of the brake apply valve 100 in the manner depicted in FIG. 4 to provide hydraulic actuation of the brake packs 11, as heretofore described in conjunction with the description of the brake apply valve 100, but also rotate the apply shaft 323 to initiate mechanical actuation of the brake packs 11, as previously described herein in conjunction with the explanation attendant upon FIGS. 4 and 7 through 11.

As should now be apparent, the present invention not only teaches that a brake system embodying the concepts of the present invention not only applies a pre-cooling bath to the brake packs as a result of reducing, or releasing, the throttle but also that the other objects of the invention can likewise be accomplished.

I claim:

1. An operator-controlled brake apply system having brake apply valve means comprising:
   a brake operating piston means;
   a plurality of drive friction plates;
   at least one reaction plate disposed for angular excursion between at least two adjacent drive friction plates;
   actuation of said brake operating piston means forcing said drive friction plates into engagement with said reaction plate;
   the angular excursion of said reaction plate occurring in response to engagement thereof by said drive friction plate in response to actuation of said brake operating piston means;
   conduit means for directing pressurized fluid to said piston means;
   valve means for selectively opening and closing said conduit means to direct a source of high pressure fluid to said piston means for actuating said brake apply system in response to an operator control; and,
   means responsive to angular excursion of said reaction plate for operating said valve means to close said conduit means and thereby preclude communication between said conduit means and said piston means in order to obviate the continued application of fluid applied operating force to said friction means.

2. An operator-controlled brake system having a selectively actuatable hydraulic apply means comprising:
   a plurality of friction means including one friction means disposed for limited angular excursion in response to torque transmission by said plurality of friction means;
   fluid operated means for supplying an operating force to said friction means in response to said hydraulic apply means; and,
   valve means for directing unrestricted fluid flow from an elevated pressure source to the fluid operated means upon initial actuation of said hydraulic apply means;
   said valve means being responsive to angular excursion of said one friction means to close said valve means to the elevated pressure source and thereby preclude not only fluid flow through said valve means but also the continued application of fluid applied operating force to said friction means.

3. An operator-controlled brake system having a selectively actuatable hydraulic apply means, as defined in claim 2, further comprising:
   an orifice means to vent said high pressure fluid from said piston means, at least when said valve means is closed;
   said plurality of friction means having not only a plurality of drive plate members drivingly connected with a rotary output member but also a plurality of reaction plate members drivingly connected with a stationary member and being disposed in alternating relation with said drive plate members; and,
   wherein said one friction means disposed for limited angular excursion is one of said reaction plate members.

4. An operator-controlled brake system having a selectively actuatable hydraulic apply means, as set forth in claim 3, wherein:
   said one friction means being disposed to permit limited angular excursion relative to said stationary member during torque transmission in order to provide a signal to close the valve means after a predetermined amount of angular excursion.

5. An operator-controlled brake apply system having a selectively actuatable hydraulic apply means comprising:
   a brake operating piston means;
   a plurality of drive friction plates drivingly connected with a stationary member;
   a reaction plate having tang means disposed for limited angular excursion between adjacent friction drive planes and said angular excursion occurring in response to engagement of said brake operating piston means with said drive plate means;
   conduit means for directing pressurized fluid to said brake operating piston means;
   valve means for communicating a source of elevated pressure to said conduit means for actuation of said brake apply system by an operator;
   said stationary member having a plurality of splines; and,
   switch means operatively connected to said valve means, said switch means disposed between adjacent splines of said stationary member, wherein said angular excursion of said reaction plate relative to said stationary member actuates said switch means to provide a signal to close said valve means after a predetermined amount of angular excursion.

* * * * *